United States Patent
Kulkarni et al.

(10) Patent No.: US 10,929,116 B2
(45) Date of Patent: *Feb. 23, 2021

(54) GENERATION OF DYNAMIC SOFTWARE MODELS USING INPUT MAPPING WITH FEATURE DEFINITIONS

(71) Applicant: Oracle International Corporation, Redwood Shores, CA (US)

(72) Inventors: Prasad Kulkarni, San Ramon, CA (US); Manish Daga, Bangalore (IN); Shivaranjan Gurunanjappa, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,248

(22) Filed: Oct. 24, 2019

(65) Prior Publication Data
US 2020/0057620 A1    Feb. 20, 2020

Related U.S. Application Data

(63) Continuation of application No. 16/279,839, filed on Feb. 19, 2019, now Pat. No. 10,496,384, which is a continuation of application No. 15/436,016, filed on Feb. 17, 2017, now Pat. No. 10,255,051.

(60) Provisional application No. 62/370,106, filed on Aug. 2, 2016.

(51) Int. Cl.
  *G06F 9/44*   (2018.01)
  *G06F 8/60*   (2018.01)
  *G06F 8/38*   (2018.01)
  *G06F 8/10*   (2018.01)
  *G06F 8/35*   (2018.01)
  *G06Q 10/06*  (2012.01)

(52) U.S. Cl.
  CPC ............... *G06F 8/60* (2013.01); *G06F 8/10* (2013.01); *G06F 8/35* (2013.01); *G06F 8/38* (2013.01); *G06Q 10/067* (2013.01)

(58) Field of Classification Search
  None
  See application file for complete search history.

(56) References Cited

U.S. PATENT DOCUMENTS

| 8,239,821 B2 | 8/2012 | Cook | 717/104 |
| 8,819,542 B2 | 8/2014 | Cudich | 709/203 |
| 8,869,098 B2 | 10/2014 | Elaasar | 717/104 |
| 2006/0048140 A1 | 3/2006 | Boctor | 717/175 |

(Continued)

OTHER PUBLICATIONS

An Oracle White Paper; Delivering ValueWith Oracle E-Business Suite ALM Release 12.1+; Jul. 2013; 9 pages.

(Continued)

*Primary Examiner* — Insun Kang
(74) *Attorney, Agent, or Firm* — Trellis IP Law Group, PC

(57) ABSTRACT

A system and method for facilitating construction of and/or adaptation of a dynamic software model. One embodiment provides for generating software models by mapping user selections to one or more model features as specified by feature definitions. An initial software model is used to obtain the user selections. Artifacts are associated with the business planning model according to the selections by mapping the selections to model features according to previously determined feature definitions.

20 Claims, 19 Drawing Sheets

(56) References Cited

U.S. PATENT DOCUMENTS

| | | | | |
|---|---|---|---|---|
| 2006/0112399 A1* | 5/2006 | Lessly | ............... | G06F 8/38 |
| | | | | 719/318 |
| 2006/0241956 A1* | 10/2006 | Levy | ............... | G06Q 10/10 |
| | | | | 703/6 |
| 2007/0283318 A1 | 12/2007 | Tong | ............... | 717/104 |
| 2008/0077849 A1* | 3/2008 | Adams | ............... | G06F 40/169 |
| | | | | 715/230 |
| 2008/0209390 A1 | 8/2008 | Dutta | ............... | 717/104 |
| 2009/0037237 A1* | 2/2009 | Weber | ............... | G06Q 10/067 |
| | | | | 705/7.11 |
| 2009/0077531 A1 | 3/2009 | Miloslavsky | ............... | 717/100 |
| 2009/0100405 A1* | 4/2009 | Belenky | ............... | G06F 8/10 |
| | | | | 717/104 |
| 2010/0131916 A1* | 5/2010 | Prigge | ............... | G06F 8/10 |
| | | | | 717/104 |
| 2011/0161922 A1 | 6/2011 | Gerken | ............... | 717/106 |
| 2011/0173680 A1 | 7/2011 | Bates | ............... | 726/4 |
| 2011/0239183 A1* | 9/2011 | Paradkar | ............... | G06F 8/10 |
| | | | | 717/104 |
| 2012/0124547 A1 | 5/2012 | Halbedel | ............... | 717/100 |
| 2012/0124553 A1* | 5/2012 | Eschenroeder | ............... | G06F 8/71 |
| | | | | 717/121 |
| 2012/0185821 A1 | 7/2012 | Yaseen | ............... | 717/105 |
| 2012/0198415 A1* | 8/2012 | Brandt | ............... | G06F 8/73 |
| | | | | 717/104 |
| 2013/0031493 A1* | 1/2013 | Ritter | ............... | G06F 8/38 |
| | | | | 715/762 |
| 2013/0138690 A1* | 5/2013 | Reisbich | ............... | G06Q 10/067 |
| | | | | 707/772 |
| 2013/0247006 A1 | 9/2013 | Trowbridge | ............... | 717/126 |
| 2013/0305212 A1* | 11/2013 | Reisbich | ............... | G06F 11/3664 |
| | | | | 717/102 |
| 2014/0075407 A1 | 3/2014 | Donis | ............... | 717/102 |
| 2014/0181788 A1* | 6/2014 | Sullivan | ............... | G06F 9/451 |
| | | | | 717/109 |
| 2014/0215430 A1 | 7/2014 | Abrahams | ............... | 717/104 |
| 2015/0120397 A1* | 4/2015 | Vissapragada | ............... | G06F 8/10 |
| | | | | 705/7.36 |
| 2015/0235154 A1* | 8/2015 | Utschig | ............... | G06Q 10/0637 |
| | | | | 705/7.36 |
| 2015/0261518 A1 | 9/2015 | Viswanathan | ............... | 717/168 |
| 2016/0070541 A1 | 3/2016 | Lee | ............... | 717/101 |
| 2016/0070832 A1* | 3/2016 | Boahene | ............... | G06Q 10/067 |
| | | | | 703/13 |
| 2016/0078379 A1* | 3/2016 | Branch | ............... | G06Q 10/0637 |
| | | | | 705/7.36 |
| 2016/0103661 A1 | 4/2016 | Meigen | ............... | 717/104 |
| 2016/0147518 A1 | 5/2016 | Dimitrakos | ............... | 717/120 |
| 2017/0140307 A1* | 5/2017 | Gottemukkala | ............... | G06Q 10/067 |
| 2017/0177305 A1* | 6/2017 | Charfi | ............... | G06F 30/00 |
| 2017/0193409 A1* | 7/2017 | Stevens | ............... | G06F 16/951 |
| 2017/0235550 A1* | 8/2017 | Fu | ............... | 717/104 |
| 2017/0286277 A1 | 10/2017 | Lau | | |
| 2017/0293473 A1 | 10/2017 | Woodward | | |
| 2019/0251486 A1* | 8/2019 | Gottemukkala | ............... | G06Q 10/06311 |

OTHER PUBLICATIONS

An Oracle White Paper; UPK Best Practices for Implementation and Upgrade Projects; Oct. 2006; 9 pages.

* cited by examiner

GENERATION OF DYNAMIC SOFTWARE MODELS USING INPUT MAPPING WITH FEATURE DEFINITIONS

CROSS REFERENCE TO RELATED APPLICATIONS

This application is a continuation of the following application, U.S. patent application Ser. No. 16/279,839, entitled GENERATION OF DYNAMIC SOFTWARE MODELS USING INPUT MAPPING WITH FEATURE DEFINITIONS, filed on Feb. 19, 2019, which is a continuation of U.S. patent application Ser. No. 15/436,016, entitled GENERATION OF DYNAMIC SOFTWARE MODELS USING INPUT MAPPING WITH FEATURE DEFINITIONS, filed on Feb. 17, 2017, which claims the benefit of U.S. Provisional Patent Application Ser. No. 62/370,106, entitled GENERATING DYNAMIC MULTI DIMENSIONAL PLANNING MODEL BASED ON BUSINESS QUESTIONS, filed on Aug. 2, 2016, which are hereby incorporated by reference as if set forth in full in this application for all purposes.

BACKGROUND

The present application relates to computing, and more specifically to the generation of software models by mapping user selections to one or more model features as specified by feature definitions.

Efficient, adaptable, and insightful planning systems and methods can be particularly important in enterprise applications, where accurate planning and informed decision making can enhance enterprise profits. Conventionally, static generic planning models include "one size fits all" models, where static planning software characterized by the static models attempts to accommodate the needs of various types of organizations or usage domains. However, accommodation of widely diverse planning needs of different organizations can be difficult, leading to plan inaccuracies and inefficiencies. Accordingly, the static planning software often exhibits sub-optimal fits between the offered software functionality and the needs of different companies and software-usage domains.

To improve the fit between planning-software features and the needs of different companies, planning models and associated planning software are often built from scratch to meet the needs of a specific business and/or application. However, developing such fully custom planning software can be prohibitively time consuming and costly.

To reduce software development costs, prebuilt static planning models may be customized for specific business/application needs. However, conventional software customization mechanisms are often complex, requiring specialized software developers to develop, deploy, and properly integrate the customizations. Accordingly, use of such conventional customization mechanisms to customize prebuilt static planning models and associated software can also be undesirably time consuming and costly.

Hence, while use of static prebuilt default planning models may reduce software implementation costs (over that of building such static models from scratch), conventional methods for customizing such static prebuilt models can also be undesirably time consuming, e.g., requiring specialized software developers to manipulate and/or add extensions to the prebuilt package to accommodate unique or specific business needs.

SUMMARY

An example method facilitates construction of and/or adaptation of a dynamic software model (e.g., as may be used by a customer administrator), which may then be deployed as a cloud-based incrementally updatable software application. The example method includes obtaining an initial business planning model; displaying one or more business questions, wherein the one or more business questions pertain to one or more business planning model artifacts that characterize or describe one or more User Interface (UI) display screens to be generated for an updated business planning model; receiving one or more answers to the one or more business questions; grouping the one or more business model artifacts by the one or more answers and/or business questions, resulting in one or more groups of the one or more artifacts; determining a difference between one or more aspects of the updated business planning model to be generated and the initial business planning model based on the one or more groups of the one or more artifacts; and employing a description of the one or more differences to generate the updated business planning model.

In a more specific embodiment, the example method further includes determining one or more sets of software functionality to associate with the one or more business planning model artifacts. The one or more sets of functionality represent one or more business planning model features and/or sets thereof. The one or more predefined business planning model features may include, for example, one or more of the following: financial statement planning model functionality, workforce planning model functionality, capital planning model functionality, and projects planning model functionality. The one or more predefined business planning model features may include sub-functionality that includes one or more sub features. The one or more sub-features may include, for example, one or more of the following: revenue, expense, income statement, balance sheet statement, cash flow functionality, and so on.

The one or more artifacts may include, for example, metadata pertaining to a layout of the one or more UI display screens. The one or more artifacts may further include descriptions of one or more of: dashboards, forms, form folders, rule sets, data dimensions, members of data dimensions, new dimensions, data maps, lists, and so on. The one or more artifacts may include independent artifacts or dependent artifacts, e.g., a composite form, rule set, and so on.

In the specific embodiment, the step of selecting, determining, or otherwise obtaining an initial business planning model further includes determining an initial set of the one or more business questions; and constructing the initial business planning model in accordance with the one or more business questions. The step of determining a difference may further include using delta encoding to generate a file describing updates to apply to the initial business planning model so as to yield the updated business planning model.

The description (called the delta) is included in the file, which may be an eXtensible Markup Language (XML) file. The specific example method may further include selectively deploying an updated cloud-based enterprise software application characterized by the updated business planning model, and repeating the method so as to further update the updated business planning model to further meet existing or new business requirements.

The step of employing a description may further include obtaining plural business planning models, including the updated business planning model, and providing one or more UI controls to enable defining one or more interdependencies between one or more artifacts or features of the updated business planning model and one or more other artifacts or features of other business planning models of the plural business models. Interdependencies between artifacts and features of a single business model may also be accommodated similarly.

The specific example method further includes propagating further adjustments to the updated business planning model in accordance with the dependencies, so as to ensure that conflicts are not introduced among the plural business planning models via the updating of the business planning model.

Accordingly, various embodiments discussed herein enable generation and use of dynamic multidimensional business planning models (also simply called planning models herein) in accordance with business questions and/or answers thereto. A developer framework may facilitate defining an initial set of business questions, called queries, which are associated with software functionality (e.g., features and/or groups thereof), which are in turn associated with artifacts (and/or groups thereof), e.g., via feature-artifact mappings.

After development and deployment of an initial business planning model, the initial planning model may then be selectively updated based on responses to business questions. The responses or answers are then usable to dynamically generate a new model and associated UI display screen flows.

The development framework, and/or a framework in which the software application embodying the business model is deployed, may further support addition of flex dimensions to the business planning model, and may further support handling and accommodating any impacts of the flex dimensions on attributes, features, and/or other aspects of the business planning model.

The frameworks may support dynamic generation of integrations for newly added attributes and features to the business planning model. Accordingly, different business processes (e.g., projects, workforce, capital, financials, etc.) may be adjusted based on responses to business questions such that no conflicts are introduced between existing and/or added processes and/or associated software functionality during incremental updates to the business planning model.

By enabling efficient and rapid generation of specialized planning models on the fly, various embodiments discussed herein can empower business users to quickly adapt to changing business planning needs and/or to meet existing business planning requirements. For example, a business that plans delivery of services by geography, market, or product may readily decide to plan services only by market and not by product or geography. Such decisions are then embodied in question answers, which are then leveraged to dynamically update the associated business planning model used by the cloud-based business planning software to which the business user has access.

The underlying mechanisms for updating the business planning model may leverage model features, artifacts (including dynamically generated artifacts), business questions, and mappings and/or associations therebetween, to efficiently integrate business model changes without introducing software conflicts, such as problematic integrations. Flex dimensions may also be employed to facilitate model updating.

Accordingly, various shortcomings of conventional static business planning models, e.g., problems with inaccurate fits between offered functionality and business planning needs, are readily overcome by using embodiments discussed herein, as the dynamic business models are configured to enable incremental adaptation of the underlying business model to address specific or individualized business needs.

Hence, by enabling development and deployment of an initial seed dynamic planning model; then enabling incremental updates to the seed model based on answers to business questions (which may be dynamically generated in certain embodiments), the business model may be enhanced over time, thereby enabling the model to grow and adapt into arbitrarily complex models to meet the specific needs of users, i.e., customers of cloud-based software applications embodying the model.

Furthermore, by enabling automatic handling of dependent artifacts describing UI display screen aspects or characteristics (e.g., by selectively populating or associating the artifacts with features, i.e., software functionality) in accordance with answers to business questions, business customers have some control over how the business model develops over time. Additional user options enabling the defining of dependencies between different business model features may further facilitate efficient integrations of different software processes and associated functionality as the business model grows and adapts.

A further understanding of the nature and the advantages of particular embodiments disclosed herein may be realized by reference of the remaining portions of the specification and the attached drawings.

BRIEF DESCRIPTION OF THE DRAWINGS

FIG. 14-1 illustrates additional portions of the XML file of FIG. 13 after a customer administrator has specified "Revenue/Gross Margin" as an answer to the query of FIG. 13, resulting in updating of the XML file.

FIG. 14-2 is a continuation of FIG. 14-1 and illustrates example portions of a second XML file (called Features.xml herein) that is automatically updated responsive to the answer(s) to business question(s) specified in the updated XML file of FIG. 14-1, which has been updated in accordance with the answer(s) specified via a customer administrator using the UI display screen portion of FIG. 13.

FIG. 15-1 illustrates additional example portions of the second XML file of FIG. 14-2, and shows how the different example portions define different deployed application UI display screen sections and associated functionality represented by artifacts and the associated selected feature that corresponds to an answer provided via the UI display screen section shown in FIG. 13.

FIG. 15-2 is a continuation of FIG. 15-2 and illustrates additional example UI display screen sections of a deployed application, the UI display screen sections of which are defined via the second XML file shown in FIG. 15-1.

DETAILED DESCRIPTION OF EMBODIMENTS

Figure 1:
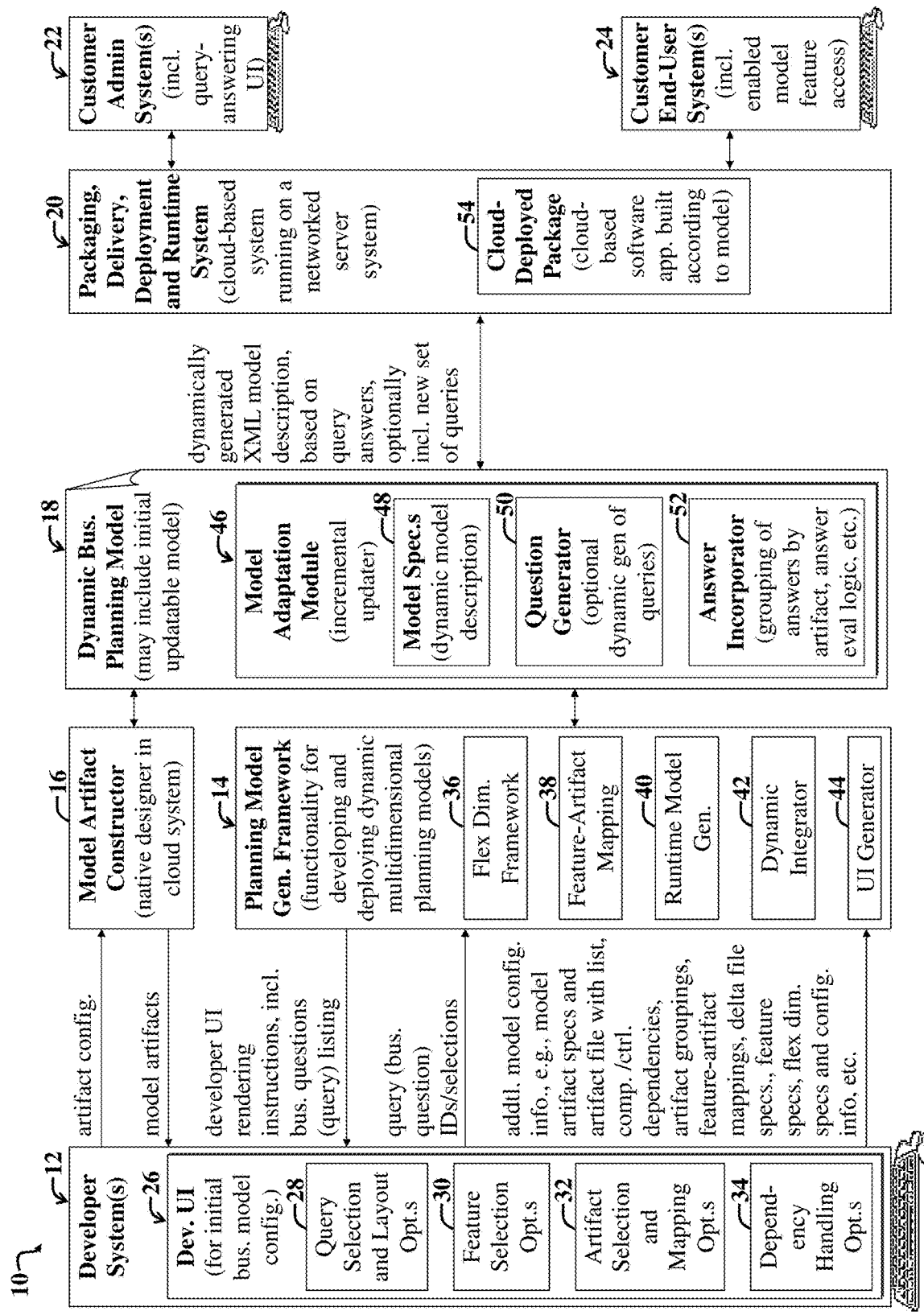
FIG. 1 is first a block diagram illustrating a first example system and accompanying enterprise computing environment configured to enable initial development of a dynamic business planning model, incremental updating of the business planning model to meet specific enterprise needs, and use of the resulting updated business planning model as part of a cloud-based enterprise software application or service.

For the purposes of the present discussion, an enterprise may be any organization of persons, such as a business, university, government, military, and so on. The terms "organization" and "enterprise" are employed interchangeably herein. A talent management system or application may be any software application or functionality for facilitating selecting, organizing, or managing enterprise personnel or tasks performed thereby. Personnel of an organization may include any persons associated with the organization, such as employees, contractors, board members, and so on.

Software functionality may be any function, capability, or feature, e.g., stored or arranged data, that is provided via computer code, i.e., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

A UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on). Example ERP applications include Customer Relationship Management (CRM), Human Capital Management (HCM), Business Intelligence (BI), enterprise asset management, enterprise asset management, corporate performance and governance applications, and so on.

The terms "enterprise software" and "enterprise application" may be employed interchangeably herein. However, an enterprise application may include one or more enterprise software modules or components, such as UI software modules or components.

Note that conventionally, while certain financial tools, tables, and so on (e.g., balance sheets, cash flow statements, etc.), are standardized, different companies may prefer to maintain and view operational and financial planning data and tasks differently, e.g., in accordance with different business and computing environment requirements. This can be particularly true at granular levels, i.e., where detailed enterprise data must be observed and analyzed in accordance with business planning objectives.

For example, a particular service company may experience substantial compensation expenses (e.g., payments to employees, contractors, etc.), which may represent the primary driver for expense planning. Similarly, a small consulting company may experience substantial travel expenses, which may represent a primary driver for expense planning. Accordingly, two different service companies may base their expense planning on substantially different drivers.

Similarly, different companies may employ different methods of accounting, e.g., a direct method or indirect method of accounting. Accordingly, different companies may rely upon different drivers for handling accounting details.

Furthermore, the granularity of planning (i.e., the level of detail demanded or required) may vary across different companies and/or business types, segments, or other domains. For example, a Fast Moving Consumer Goods (FMCG) company may plan revenue by product, market, channel, and segment, whereas an Information Technology (IT) company may plan revenue by service, market, and customers. Accordingly, different companies may rely upon different drivers for various types of planning.

In addition, while certain companies may prefer to perform business planning using a collection of standard or common drivers and associated software modules and functionality (e.g., standard labor, material, etc.), other companies may prefer to perform direct entry for project expenses, revenue, etc.

Accordingly, different businesses may have different planning requirements or needs, which can be difficult to meet using conventional static business planning modules and associated software applications. Certain embodiments discussed more fully below provide systems and accompanying mechanisms and methods for enabling dynamic adaptation of an existing initial business planning model (which may be called a seed model herein), thereby enabling the initial seed planning model to uniquely grow to meet individual or specific needs of a given business or organization.

For clarity, certain well-known components, such as hard drives, processors, operating systems, power supplies, routers, Internet Service Providers (ISPs), identity management systems, workflow orchestrators, process schedulers, integration brokers, Tenant Automation Systems (TASs), OnLine Analytical Processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 is first a block diagram illustrating a first example system 10 and accompanying enterprise computing environment configured to enable initial development of a dynamic business planning model 18, incremental updating of the business planning model 18 to meet specific enterprise needs, and use of the resulting updated business planning model 18 as part of a cloud-based enterprise software application or service 54.

The example system 10 includes a developer computer system 12 (also simply called the developer system or the developer computer herein) in communication with a planning model generation framework 14 and a model artifact constructor 16. The model artifact constructor 16 may leverage preexisting functionality, e.g., as may be available via a native designer in a cloud computing system implemented as part of the system 10.

The planning model generation framework 14 and model artifact constructor 16 that are leveraged to develop the business planning model 18, may further communicate with a packing, delivery, deployment and runtime system and/or computing framework 20. The modules 14-20 may be hosted in a cloud, i.e., a server system accessible via a network, such as the Internet.

A cloud-deployed package 54, i.e., software application, embodying the business planning model 18 is said to be hosted in the cloud, i.e., cloud-based. For the purposes of the present discussion, cloud-based software may be any software run on one or more servers and accessible to client systems via a network used to communicate with the software.

In the present example embodiment, the cloud-deployed package 54 may represent a software application that may provide one or more web services for use by other software applications, and/or may provide cloud-services, e.g., on a subscription basis, to one or more client systems, e.g., a customer administrator system 22, and a customer end-user system 24. For the purposes of the present discussion, the term "customer" refers to any user, such as an administrator and/or end user, e.g., who may be part of an organization that has access to the cloud-deployed package 54.

In the present example embodiment, the developer system 12 accesses the model artifact constructor 16 and the planning model generation framework 14 via a network, such as the Internet. The developer system 12 may include a browser used to browse to the network address that provides access to functionality provided by the model artifact constructor 16 and planning model generation framework 14.

After browsing to a network address allotted for system developers, designers, and/or other qualified personnel, various dynamic model-building functionality is accessible to the developer system, e.g., via various developer UI display screens 26.

Software functionality may be any function, capability, or feature, e.g., stored or arranged data, that is provided via computer code, i.e., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, and so on.

Software functionality, or a set of software functionalities, that is/are associated with or used by a business planning model, is called a model feature (or simply feature) herein. Examples of features include, but are not limited to, software functionality for implementing indirect cash flow statements, income statements, and so on.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software. The terms UI control and UI component (or simply component) may be employed interchangeably herein.

A descriptor or characteristic of a business planning model and/or associated UI display screens and/or UI layout, is called a model artifact (or simply artifacts) herein. Examples of model artifacts include, but are not limited to metadata (e.g., metadata describing a UI layout or UI model framework), dashboards, business rules, forms, dimensions, and so on.

Artifacts may represent or be associated with categories of features or software functionality that will be associated with the artifacts. When functionality is associated with a business model artifact, the artifact is said to be seeded with the functionality or feature.

Artifacts and features may be dependent or independent. A dependent artifact or feature is one that relies upon the existence or operation of another artifact or feature for proper functioning. Similarly, an independent artifact or feature may be added to a model without requiring special handling of interdependencies, as discussed more fully below. Examples of potential dependent artifacts include, but are not limited to composite forms, rule sets, and so on.

A valid artifact may be any artifact that may be associated with (e.g., seeded with) a feature that is available for a business planning model. The availability of a feature to an artifact may be defined in an initial business planning model 18, e.g., by a developer using business planning model designer software represented by the planning model generation framework 14 and model artifact constructor 16 of FIG. 1.

In the present example embodiment, the developer UI display screens 26 include a query-selection UI display screen (and/or set of UI controls) 28, a feature-selection UI display screen 30, an artifact-selection UI display screen 32, and an artifact and feature dependency handling UI display screen 34.

The planning model generation framework 14 includes a flex-dimension framework 36, a feature-artifact mapping module 38, a runtime model generator 40, a dynamic functionality integrator 42, and a UI generator 44.

The generated dynamic business model 18, which may be defined by and/or specified via an eXtensible Markup Language (XML) document, includes a specification 48 of the business planning model 18, and optionally, embedded question generator code (or a link to code) 50 and answer incorporator 52, e.g., for facilitating incorporating answers to business questions, as may be provided via the customer administrator system 22, as discussed more fully below.

The packaging, delivery, deployment, and runtime system 20 hosts and runs the deployed cloud-based software package or application 54. Functionality of the deployed application 54 is accessible to the customer end-user client system 24.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the question generator 50 and answer incorporator 52 shown as part of the dynamic business planning model 18 may instead, or in addition, be incorporated into the planning model generation framework 14.

Furthermore, certain modules of the planning model generation framework 14 may be implemented client-side, e.g., on the developer system 12. In general, certain server-side, i.e., cloud-based modules (i.e., running on a server or server system) may be implemented client-side (e.g., running on a client computer communicating with a server), and vice versa, in a manner different than shown in FIG. 1.

In an example scenario, a business model developer (also called designer herein) employs the developer system 12, e.g., the artifact-selection screen 32, to specify, access, and/or configure model artifacts, leveraging the model artifact constructor 16. The artifact-selection screen 32 presents one or more UI controls (which may provide so-called user options, or simply options, herein) for facilitating developer construction, selection, and configuration of model artifacts, as well as UI controls enabling configuration and/or specification of mappings and/or rules associated with the artifacts. The mappings discussed herein refer to associations between business model artifacts and features, and are also called feature-artifact and/or artifact-feature mappings herein.

After developing and/or configuring a set of one or more business model artifacts, e.g., by leveraging the artifact-selection screen(s) 32 and the associated model artifact constructor 16, the resulting artifacts may be stored locally or via the server system that hosts the modules 14-20.

Next, in the present example scenario, the developer employs the feature-selection screen 30 to select and/or configure a set of business model features. Feature construction and/or selection may also be facilitated via the model artifact constructor 16 and/or code running as part of the planning model generation framework 14, e.g., via code running on the feature-artifact mapping module 38.

After initial selection and/or configuration of a set of one or more model artifacts and one or more model features, the developer may employ one or more UI controls of the artifact-selection screen 32 to configure and/or specify initial mappings and/or associated mapping rules that define associations between the configured artifacts and features.

The artifact-selection and mapping options screen 32 may include UI controls that leverage functionality of the feature-artifact mapping module 38 of the planning model generation framework 14. The feature-artifact mapping module 38 may include additional code for implementing automatic feature-artifact mappings in accordance with groupings of business questions and/or answers to the business questions, e.g., so as to automatically update the dynamic business planning model 18, as discussed more fully below.

The UI generator 44 of the planning model generation framework 14 includes code for generating rendering instructions to render the developer-side UI display screens 26, and further includes code for generating rendering instructions for UI display screens of the cloud-deployed package 54, which are exposed to the customer end-user system 24.

Figure 10:
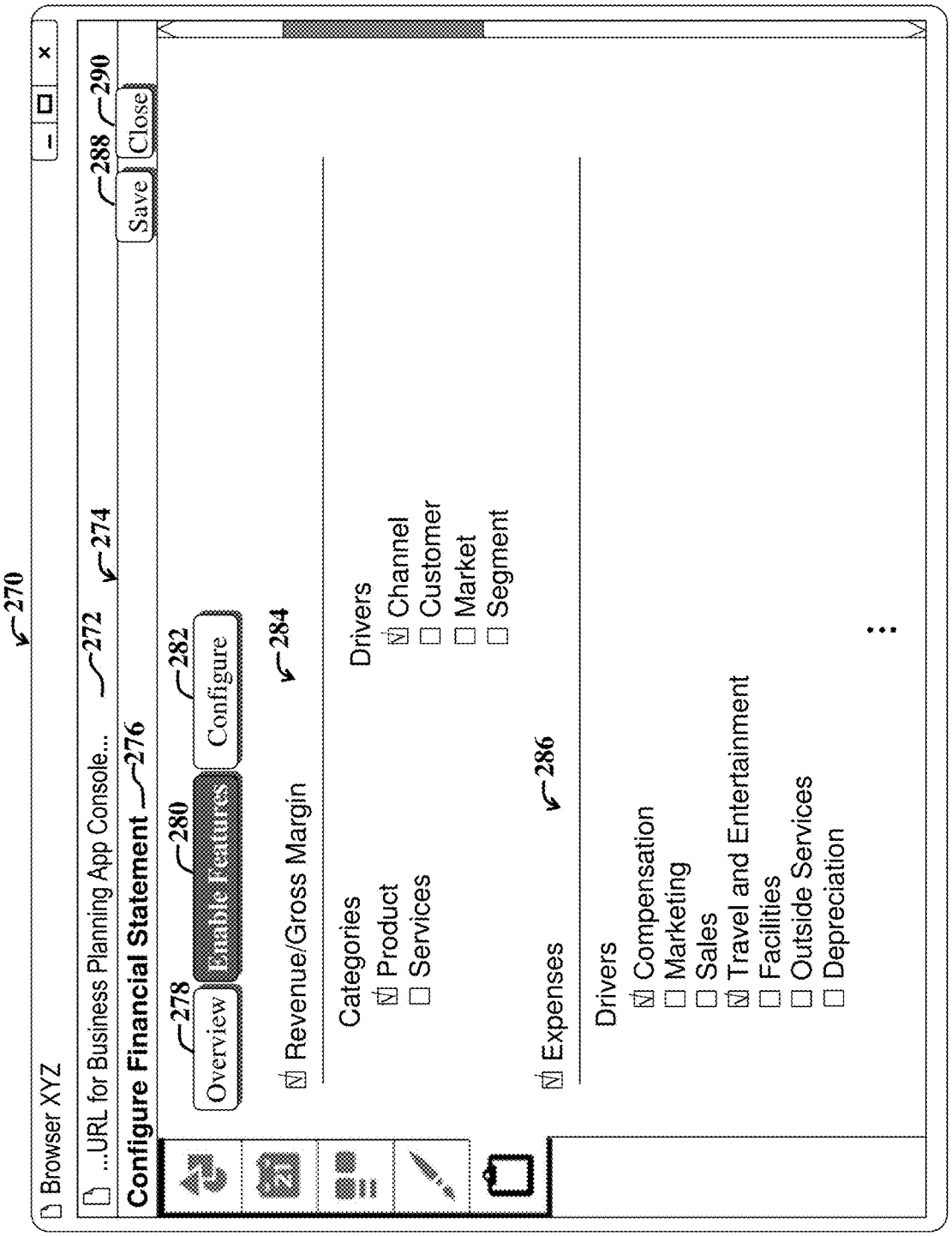
FIG. 10 shows a third example UI display screen that may be accessible via the customer administrator system(s) of FIG. 1 and illustrating administrator options to provide answers to business questions, which may then be used to automatically adapt the associated software application in accordance with the provided answers.

The developer-side query-selection and layout options screen 28 includes UI controls and access to associated functionality for defining, selecting, and/or grouping business questions (called queries) to be exposed in a UI display screen accessible to the customer administrator system 22. The UI display screens displayed as part of the dynamic business planning model 18 and exposed to the customer administrator system 22 include a UI display screen (an example of which is shown in FIG. 10) that lists business questions that have been enabled for the existing dynamic business planning model 18.

The initial business questions selected by a developer using the query-selection and layout options screen 28 may be listed and/or otherwise formatted in accordance with developer-selected layout options provided via the query-selection and layout options screen 28. UI controls of the query-selection and layout options screen 28 provide developer-access to associated functionality (e.g., functionality of which may be provided via the UI generator 44 and feature-artifact mapping module 38 and/or other modules of the planning model generation framework 14) for defining, selecting, and/or otherwise configuring business questions and how the questions will be laid out in a UI display screen exposed to a customer administrator, e.g., via the customer administrator system 22.

Note that mappings of artifacts (which are grouped by business question or by business question group or type) to features may depend, in part, on the business questions established via use of the query-selection and layout options screen 28.

The developer may further specify dependency-handling options via one or more UI controls provided in the dependency-handling options screen 34. The dependencies may include dependencies between business questions (e.g., in cases where the answer to one business question may affect other questions or answers thereto), and dependencies between different artifacts (and/or groups or types thereof), and dependencies between different features (and/or groups or types thereof). Such dependencies may require that a change (e.g., difference) in one question, artifact, and/or feature, be propagated to another question, artifact, and/or feature.

The difference is called a delta. Various embodiments discussed herein may employ delta processing to ensure that dependencies are handled without introducing conflicts. This involves referencing the established associations and associated selected configuration options (e.g., as may be specified by a developer via the dependency-handling options screen 34) and making adjustments to the business model based thereon and in response to a detected change in an artifact, feature, question, etc.

Accordingly, the developer system 12 forwards business question selections and associated identifications, descriptions, and/or configuration information (e.g., as may be provided responsive to developer manipulation of the query-selection and layout options screen 28) to the business planning model generation framework 14. In addition, various additional UI controls included among the developer UI display screens 26 may enable specification and forwarding of additional information to the planning model generation framework 14, including, but not limited to additional business model configuration information, e.g., model artifact specifications, an artifact file listing artifacts for an initial business planning model, component (e.g., UI control) dependencies (between UI controls to be rendered and exposed via the cloud-deployed package 54), artifact grouping information, feature-artifact mapping data, delta file specifications (e.g., describing dependencies between various questions, artifacts, and/or features), feature specifications, flex dimension configuration parameters and/or specifications, and so on.

The business planning model generation framework 14 then processes the inputs received via the developer system 12 to automatically construct an initial business planning model, also called the seed model. Some example modules usable to construct the initial dynamic business planning model 18 and to implement incremental updates thereto, include, but are not limited to the flex dimension framework 36, the feature-artifact mapping module 38, the runtime model generator 40, the dynamic integrator 42, and the UI generator 44.

The flex dimension framework 36 includes computer code for enabling customer administrators (e.g., using the customer administrator system 22) and/or customer end users (e.g., using the customer end-user system 14) to add flex dimensions to various UI display screens exposed via the cloud-deployed package 54. The flex dimension framework 36 then enables extension of the business planning model 18 in accordance with the added flex dimensions. Note that whether the initial business planning model 18 supports flex dimensions, which flex dimensions, if any, are supported, and behaviors of the flex dimensions, may be specified by a developer via one or more UI controls provided in the developer UI display screens 26.

The feature-artifact mapping module 38 includes computer code for enabling automatic implementation of changes introduced to the dynamic business planning model 18 in response to answers provided in response to business questions posed to an administrator (or other authorized user) of the customer administrator system 22. In particular, when an administrator provides a new answer to a question (e.g., which may be posed via a UI prompt, such as a check box), any artifacts associated with the question are then automatically populated with features via the feature-artifact mapping module 38. The resulting populated artifacts are then incorporated into an updated dynamic business planning model 18 after any artifact and/or feature dependencies are handled and/or deltas are processed.

The runtime model generator 40 includes computer code for automatically generating a new or updated dynamic business planning model 18 for incorporation into the cloud-deployed package 54. The updates to the running cloud-deployed package 54 by the runtime model generator 40 may be implemented via patching and/or other known technologies for adjusting running software applications.

The dynamic integrator 42, which may communicate with other modules of the planning model generation framework 14, facilitates implementing delta differencing processing to accommodate newly added functionality without introducing conflicts in the updated business planning model 18. The integrator 42 may further include computer code for facilitating and/or ensuring efficient interoperability between different intercommunicating business planning models and associated software applications deployed via the packaging, delivery, deployment, and runtime system 20.

Note that information exchange between the developer system 12 and between the various cloud-based modules 14-20 may be implemented via exchange of XML files that are transferred therebetween. Furthermore, the dynamic business planning model 18 may be implemented substantially via an XML document defining the model.

In the present specific example embodiment, the dynamic business planning model 18 includes an adaptation module 46, which includes computer code for facilitating some self-adaptation of the dynamic business planning model 18. Note that in other embodiments, the adaptation module 46 may be included instead in the planning model generation framework 14.

In the present example embodiment, the adaptation module 36 includes, in addition to a description of the business planning model (including a description of existing questions, artifacts, and associated features), a specification of code for a dynamic question generator 50 and an answer incorporator 52.

The dynamic question generator 50 may include computer code (and/or links thereto) for automatically adjusting a list of business questions exposed via a UI of the customer administrator system 22, e.g., in response to one or more answers provided thereby by an administrator using the customer administrator system 22. This may be particularly useful for reconfiguring the listing of displayed questions in response to an answer to a question that affects the validity of other questions displayed in (or to be displayed among) the listing of business questions.

The answer incorporator 52 may include computer code (and/or links thereto) for adjusting groupings of artifacts by answers and/or answer type or category. Answers to the business questions may be evaluated by evaluation logic to determine how a new listing of questions should be generated and laid out (in the UI exposed to the customer administrator system 22).

Note that various modules 36-44 of the business planning model generation framework 14 may intercommunicate, e.g., via interfacing functionality incorporated therein. Similarly modules 48-52 of the adaptation module 46 of the dynamic business planning model 18 may intercommunicate.

Once the initial business planning model 18 is developed and/or configured via the developer system 12, it can be deployed as the cloud-deployed package 54, which is then made available to the customer administrator system 22 and customer end-user system 24. The customer administrator may then use the customer administrator system 22 to answer business questions. The resulting answers then feed back to the framework modules 14-20, which then adapt or update the dynamic business planning model 18 in accordance with the answers. The adjustment to the dynamic business planning model 18 is effectuated through use of artifacts, which are then mapped or seeded with features corresponding to the answered questions, and in accordance with the answers to the answered questions, as discussed more fully below.

Accordingly, the present example embodiment may enable customers to substantially forgo, configuring and/or updating business planning software. Several business planning processes (which may be associated with different business planning models and/or sub-models) may be selectively and incrementally rolled out to customer end users (e.g., users of the customer end-user system(s) 24). Furthermore, integration between added features (e.g., sets of software functionality associated with different business processes) is automatically accommodated, e.g., via the dynamic integrator 42 and feature-artifact mapping module 38 of the business planning model generation framework 14.

Furthermore, by enabling customer addition of and configuration of flex dimensions to the dynamic business planning model 18, the resulting automatically handled dimensions can significantly reduce implementation time for customers to implement new sought features and associated business model artifacts.

Customers now have significant flexibility and options for configuring various planning business processes. Customers can leverage these configuration capabilities, reduce implementation time, and continue building the model over time, as necessary to meet the needs of the customer organization.

Furthermore, business planning models developed and deployed using the system 10 may now readily evolve and adapt to meet different and/or changing business needs while remaining consistent with industry-standard best practices. Furthermore, as best practices change, the dynamic business planning model 18 may adapt to comply with the new best practices.

Figure 2:
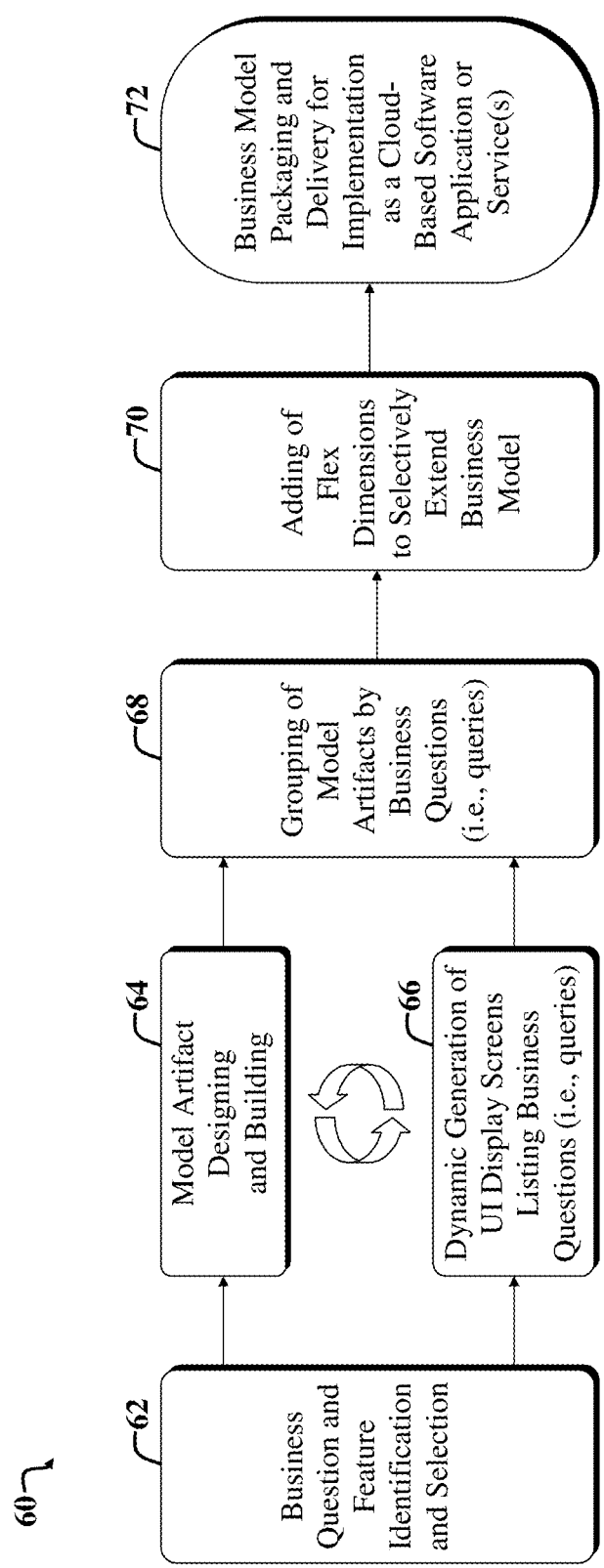
FIG. 2 is a first process flow diagram illustrating a process implemented in part via the developer system, planning model generation framework, and model artifact constructor of FIG. 1 to generate an initial dynamic business planning model that is ready for customer use and incremental updating and feature enabling.

FIG. 2 is a first process flow diagram illustrating a process 60 implemented in part via the developer system 12, planning model generation framework 14, and model artifact constructor 16 of FIG. 1 to generate an initial dynamic business planning model 18 that is ready for customer use and incremental updating and feature enabling.

The example process 60 includes an initial step 62, which involves identification and selection of initial business questions and features. The initial business questions and features are then leveraged to design and build business model artifacts in an artifact-building step 64.

Furthermore, in a screen-building step 66, initial business questions and features are further leveraged to dynamically generate one or more UI display screens for listing the business questions (e.g., which may be exposed to a customer administrator via the customer administrator system 22 of FIG. 1).

Note that the artifact-building step 64 and the screen-building step 66 may occur in parallel, and an adjustment to one may affect the other, e.g., an adjustment to an artifact, group of artifacts, or available artifacts may in turn affect which business questions are displayed in a UI display screen built in the screen-building step 66. Similarly, adjustments to listed business questions may affect which artifacts will be included among the available artifacts constructed via the artifact-building step 64.

Note that the screen-building step 66 may further include determining how various business questions are to be presented and laid out in an associated UI display screen, e.g., which UI controls (e.g., check boxes, fields, etc.) are to be used to receive answers to business questions, how the business questions are to be grouped or ordered in the UI display screen, and so on.

After the questions (and associated UI display screens listing the questions) and artifacts are designed and built (and/or otherwise described), a grouping step 68 is performed.

The grouping step 68 includes grouping model artifacts (designed and built in step 64) by business question (and/or group thereof, as specified in the screen-building step 66).

Subsequently, a flex-dimension step 70 includes adding any flex dimensions to the associated dynamic business planning model, e.g., so as to extend the business model and associated functionality offered by (or otherwise defined by) the dynamic business planning module.

After the initial configuration steps 62-70, the associated business planning model is deployed in a deployment step 72. The deployed model represents an initial business planning model, i.e., the seed model, which may then be further adapted, e.g., incrementally updated.

Figure 3:
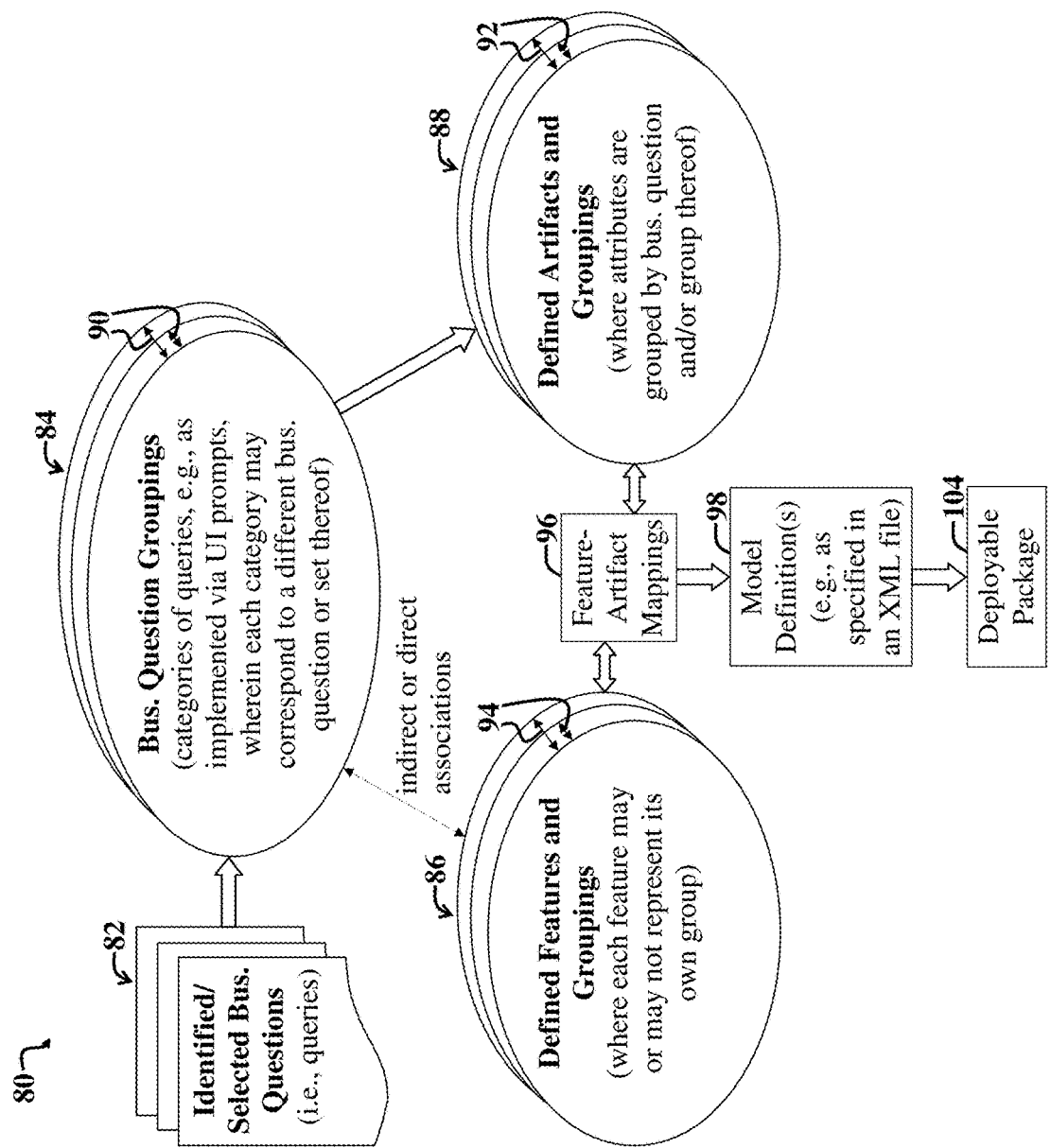
FIG. 3 illustrates example relationships between business questions (called queries herein), artifacts, features, and groupings thereof, and how such associations are leveraged to build an initial dynamic business planning model and/or to incrementally update the business planning model, which is then usable as part of a deployed cloud-based software application and/or service.

FIG. 3 illustrates example relationships 80 between business questions (called queries herein) 82, artifacts 88, features 86, and/or groupings thereof, and how such associations are leveraged to build an initial dynamic business planning model 98 and/or to incrementally update the business planning model 98 (corresponding to the model 18 of FIG. 1), which is then usable as part of a deployed cloud-based software application 104 (corresponding to the deployed package 54 of FIG. 1) and/or service.

A set of identified business questions 82 may be grouped into plural groups of one or more business questions 84. Each of the business question groupings 84 are in turn associated with respective defined groupings of one or more business artifacts 88, i.e., the artifacts of the artifact groupings 88 are grouped by business question or groups thereof 84.

The artifact groupings 88 are then mapped to, i.e., associated with groupings of one or more features (e.g., sets of software functionality) in accordance with a mapping defined via a feature-attribute mappings module 96 (which may be implemented via the feature-artifact mapping module 38 of FIG. 1).

Note that the business questions and/or groups 84 may include interdependencies 90, which are then carried forward to the associated artifacts, and appear as artifact interdependencies 92. The artifact interdependencies 92 are then carried forward and manifest as feature interdependencies 94. The interdependencies 92, 94 may be accommodated and/or specified via the attribute-feature mappings module 96.

Functionality of the dynamic integrator 42 of FIG. 1 may also be employed to ensure that dependencies associated with the attribute-feature mappings 96 are implemented without introducing conflicts between functionality implemented via the associated deployable package 104, which embodies a business model definition 98 that is based, at least in part, on the artifact-feature mappings 96.

Note that the model definitions 98 and the deployable package 104 of FIG. 3 may correspond to the dynamic business planning model 18 and the cloud-deployed package 54, respectively, of FIG. 1.

Figure 4:
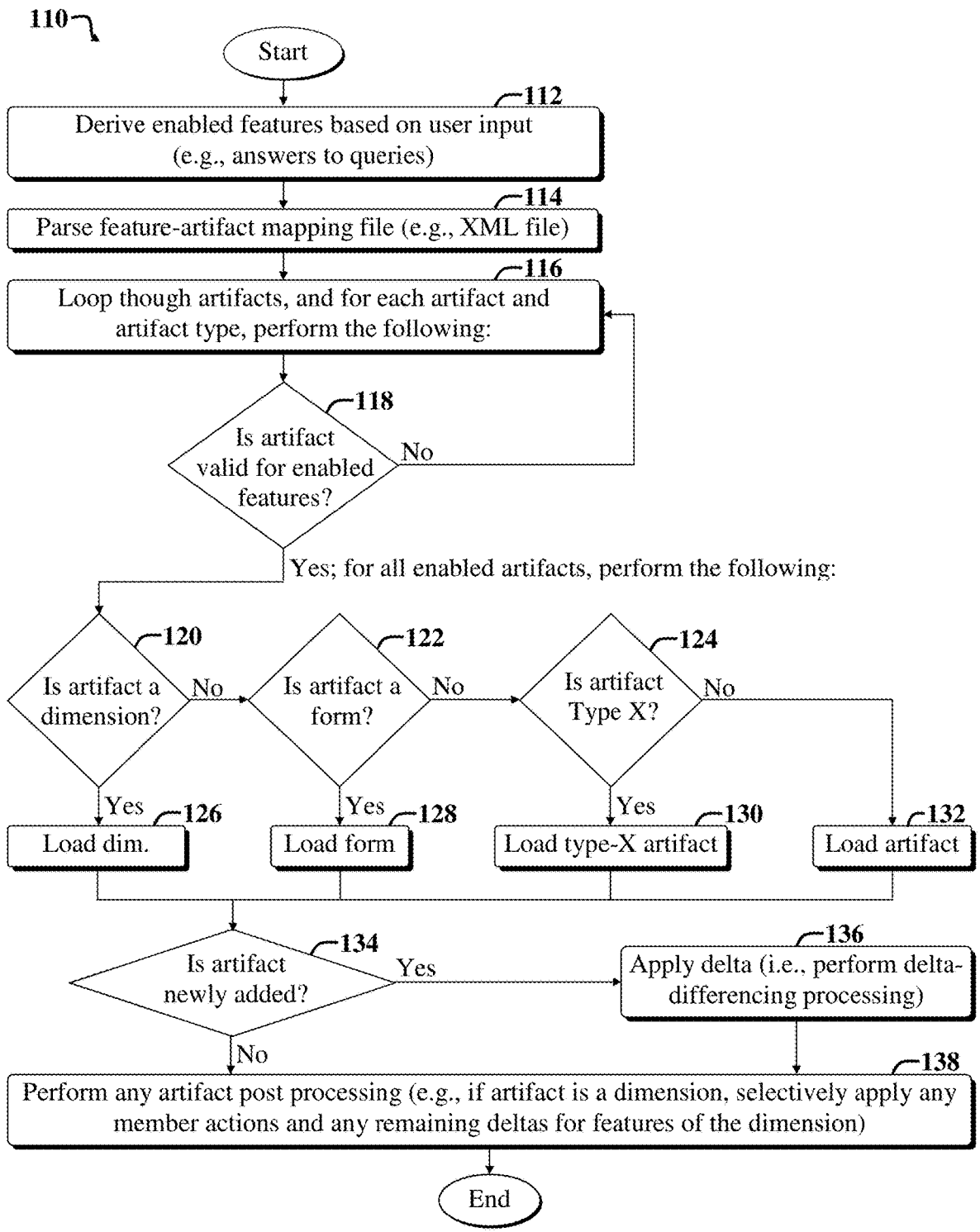
FIG. 4 illustrates a second example process flow for selectively loading artifacts for enabled or available sets of software functionality (called features) for a dynamic business planning model or updated version thereof.

FIG. 4 illustrates a second example process flow 110 for selectively loading artifacts for enabled or available sets of software functionality (called features) for a dynamic business planning model or updated version thereof.

The second example process flow 110 includes an initial feature-derivation step 112, which includes deriving enabled features (i.e., enabled for a subject business planning model). Descriptions of the enabled features are included in a feature-artifact mapping file (e.g., as may be output by the attribute-feature mappings module 96 of FIG. 3).

A subsequent parsing step 114 includes parsing the feature-artifact mapping file (which may be an XML file), enabling analysis of individual artifacts thereof. After parsing, an artifact-processing step 116 is performed.

The artifact-processing step 116 includes analyzing and/or processing each artifact and artifact type (e.g., group of artifacts) in accordance with remaining steps 118-138.

The remaining steps 118-138 include an artifact-validity-checking step 118, which involves checking whether an artifact is both valid and enabled for an associated feature. If the artifact is valid and enabled, then it is processed in accordance with subsequent steps 120-138. Similarly, the remaining steps 120-138 are performed for each valid and enabled artifact of the feature-artifact mapping file, as determined the artifact-validity-checking step 118.

The remaining steps 120-138 include determining if an artifact is a dimension in a dimension-checking step 120; if not, determining whether it is a form in a form-checking step 122; if not, determining whether it is another type of dimension in another artifact-type checking step 124. Accordingly, each artifact type may be specially processed in accordance with the artifact type.

For example, if the artifact is a dimension, a dimension-loading step 126 is performed; if a form, a form loading step 128 is performed; if another type, another loading operation 130 is performed for that artifact type. If the artifact is not of a particular type, the artifact may be loaded via a general artifact loading step 132.

If the artifact has been newly added, e.g., in response to a customer-administrator-supplied answer to a business question, as determined by a new-artifact-checking step 134, additional delta differencing processing is performed in a delta-applying step 136 before any additional artifact post processing is performed in a post-processing step 138.

If the artifact is not a newly added artifact, the post-processing step 138 is performed. Note that the post-processing step 138 may implement different types of post processing for different types of loaded artifacts, without departing from the scope of the present teachings. For example, if the artifact is a dimension, post processing may involve selective application of any member actions (i.e., actions applicable to members or sub-dimensions or elements of the dimension), and any additional deltas (that have not already been applied) that may be applicable to dimension members may be applied.

Note that when an artifact is loaded, it is seeded (also called populated with) associated feature(s), such that the artifact will be linked to the functionality of the feature. Accordingly, when the model artifact is used and/or accessed via a UI display screen exposed to a customer end user, use thereof will be coupled with the mapped functionality and/or set of functionality (i.e., feature).

Figure 5:
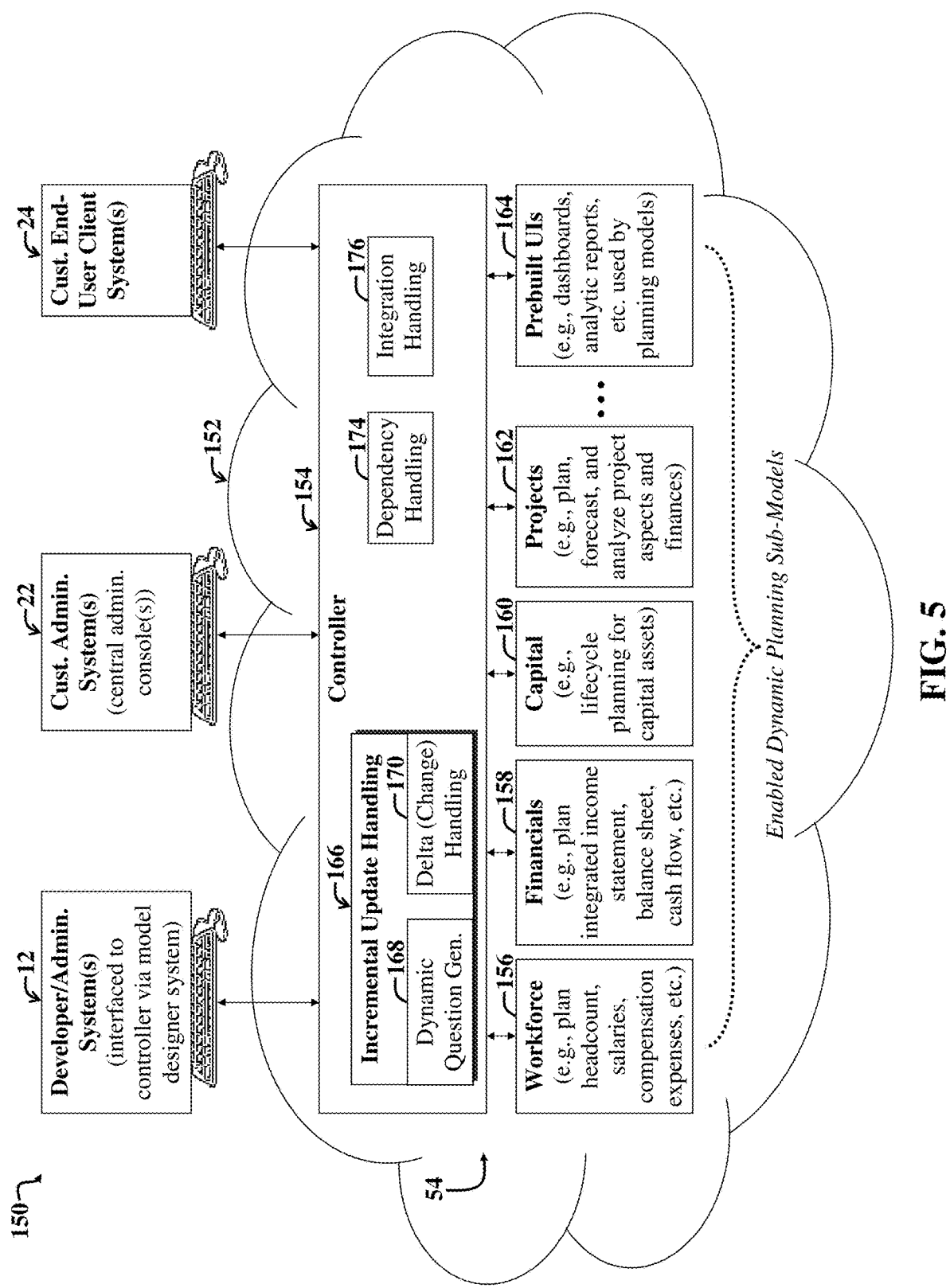
FIG. 5 is a second block diagram illustrating an example architecture of a deployed cloud-based software application that leverages the dynamic business planning model constructed and deployed via the system of FIG. 1.

FIG. 5 is a second block diagram illustrating an example architecture 150 of a deployed cloud-based software application 154-164 that leverages the dynamic business planning model constructed and deployed to a cloud 152 (i.e., a network-coupled server system) via the system 10 of FIG. 1. The software application 154-164 may correspond to or represent the cloud-deployed package 54 of FIG. 1 (also labeled as 54 in FIG. 5).

The second example system and accompanying architecture 150 includes the deployed software application 54 in communication with the developer system 12, customer administrator system 22, and the customer end-user system 24. Note that the various computer systems 12, 22, 24 communicating with the cloud-based software application 54 may be considered client systems of the deployed software application 54.

The example deployed cloud-based software application 54 includes a controller 154 in communication with various processes 156-162, which may leverage code for rendering one or more prebuilt UI display screens 164, e.g., dashboards, analytic reports, and so on. Note that the various processes 156-162 may represent, i.e., embody, different dynamic business planning models, which may in turn represent sub-models of a larger dynamic business planning model that incorporates all of the models associated with the respective business processes 156-162.

In the present example embodiment, the controller 154 includes interfacing code for facilitating intercommunications and integrations between the various processes 156-162, and further includes code for facilitating configuration, access, and control of the deployed package 54 by one or more of the client systems 22, 22, 24.

The example controller 154 includes an incremental update handling module 166, which includes an example dynamic question generator 168 and a delta handling module 170. The incremental update handling module 166 may include, for example, computer code for employing answers to business questions supplied via the customer administration system 22 to update the business planning model governing the deployed application 54. This may involve processing any resulting changes to the underlying business planning model (e.g., via the delta handling module 170), and automatically updating a listing of exposed business questions (e.g., via the dynamic question generator 168).

Note that the incremental update handling module 166 and sub-modules 168, 170 may further communicate with and leverage functionality afforded by the planning model generation framework 14 of FIG. 1.

Similarly, a dependency handling module 174 and an integration handling model 176 may also leverage the planning model generation framework 14 of FIG. 1 to facilitate handling dependencies between functionality and data used by the various enabled business processes 156-162, and for facilitating integrating any newly added or enabled processes to the deployed software application 54.

Note that one or more UI display screens exposed to the customer administrator system 22 may include options (e.g., UI controls) enabling an administrator to selectively enable and/or disable the processes 156-162, and/or to add new processes to the deployed package 54.

Figure 6:
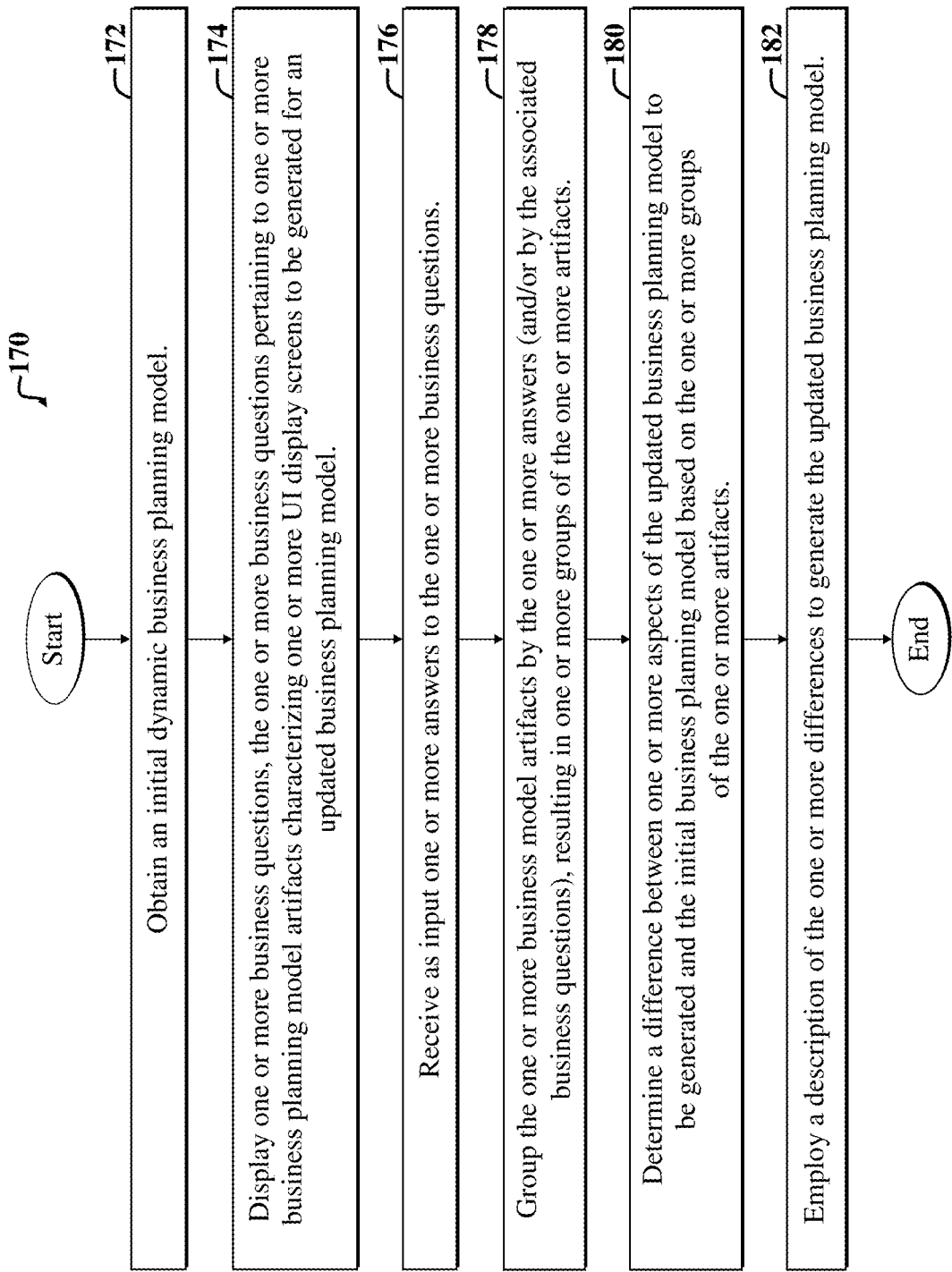
FIG. 6 is a flow diagram of a first example method implementable via the embodiments of FIGS. 1-5.

FIG. 6 is a flow diagram of a first example method 170 implementable via the embodiments of FIGS. 1-5. The first example method 170 may be implemented from the perspective of the customer administrator systems 22 of FIGS. 1 and 5.

The first example method 190 facilitates construction of a dynamic business planning model, based on an initial or seed model (e.g., as may be provided via a developer using the developer system 12 of FIG. 1). Accordingly, an initial model-obtaining step 172 includes obtaining an initial dynamic business planning model.

A subsequent question-displaying step 174 includes displaying one or more business questions. The one or more business questions pertain to, i.e., are associated with, one or more business planning model artifacts that characterize, i.e., describe, one or more UI display screens to be generated for an updated business planning model.

Next, an input-receiving step 176 includes receiving one or more answers to the one or more business questions.

Subsequently, an artifact-grouping step 178 includes grouping the one or more business model artifacts by the one or more answers, resulting in one or more groups of the one or more artifacts.

Next, a difference-determining step 180 includes determining a difference (i.e., delta) between one or more aspects of the updated business planning model to be generated and the initial business planning model.

Finally, a model-updating step 182 includes employing a description of the one or more differences to generate the updated business planning model.

Note that the method 170 may be altered, e.g., steps may be added, augmented, removed, and/or interchanged with other steps, without departing from the scope of the present teachings. For example, the first example method 170 may further include determining one or more sets of functionality to associate with the one or more business planning model artifacts, wherein the one or more sets of software functionality represent one or more business planning model features.

The one or more sets of functionality may include one or more predefined business planning model features. The one or more predefined business planning model features may include, for example, financial statement planning model functionality, workforce planning model functionality, capital planning model functionality, and/or projects planning model functionality.

The one or more predefined business planning model features may include sub-functionality that includes one or more sub-features. For example, financial statement planning model functionality may further include revenue, expense, income statement, balance sheet statement, and/or cash flow sub-functionality.

The first example method 170 may be further adjusted to specify that the one or more artifacts include metadata pertaining to a layout of the one or more UI display screens. The one or more artifacts may include, for example, descriptions of dashboards, forms, form folders, rule sets, data dimensions, members of data dimensions, new dimensions, data maps, lists, and so on.

The one or more artifacts may include one or more independent artifacts and/or dependent artifacts. The one or more dependent artifacts may include, for example, a composite form and/or a rule set.

The first example method 170 may further include, e.g., as part of the initial model-obtaining step 172, determining an initial set of the one or more business questions; then constructing the initial business planning model in accordance with the one or more business questions.

The difference-determining step 180 may further include using delta encoding to generate a file describing updates to apply to the initial business planning model so as to yield the updated business planning model. A business model description may be included in the file, which may be an XML file.

The first example method 170 may further include selectively deploying an updated cloud-based enterprise software application characterized by the updated business planning model. The first example method 170 may further include repeating the steps 172-182 of the method 170 to repeatedly update the updated business planning model to meet business requirements. Accordingly, the business planning model may be incrementally updatable.

The model-updating step 182 may further include obtaining plural business planning models, including the updated business planning model, and then providing one or more UI controls to enable defining one or more interdependencies between one or more artifacts and/or features of the updated business planning model and one or more other artifacts and/or features of other business planning models of the plural business models.

Any further adjustments to the updated business planning model may be propagated, i.e., incorporated into a newly updated model, while ensuring that conflicts are not introduced among the plural business planning models by the further updating.

Figure 7:
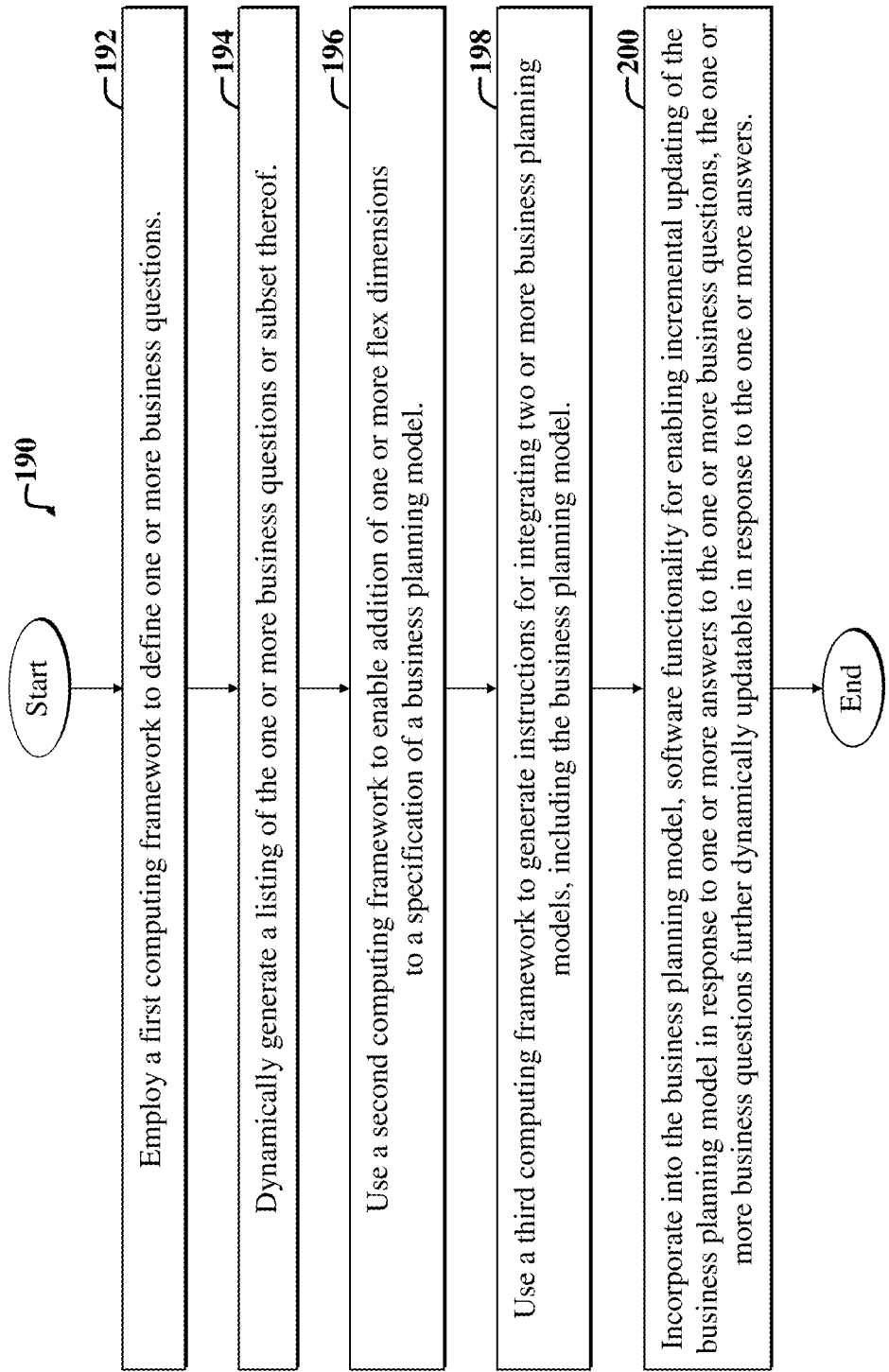
FIG. 7 is a flow diagram of a second example method implementable via the embodiments of FIGS. 1-6.

FIG. 7 is a flow diagram of a second example method 190 implementable via the embodiments of FIGS. 1-6. The second example method 190, which may be implemented from the perspective of the developer systems 12, customer administrator system 22, and/or customer end-user system 24 of FIGS. 1 and 5, facilitates implementing one or more dynamic business planning models.

The second example method 190 includes a first step 192, which involves employing a first computing framework to define one or more business questions.

A second step 194 includes dynamically generating a listing of the one or more business questions or subset thereof.

A third step 196 includes using a second computing framework for enabling addition of one or more flex dimensions to a specification of a business planning model.

A fourth step 198 includes using a third computing framework to generate instructions for integrating one or more business planning models, including the business planning model.

A fifth step 200 includes incorporating into the business planning model, software functionality for enabling incremental updating of the business planning model in response to one or more answers to the one or more business questions, the one or more business questions further dynamically updatable in response to the one or more answers.

Note that the second example method 190 may be further altered and/or replaced, without departing from the scope of the present teachings. For example, an alternative method for implementing a dynamic business planning model includes automatically generating one or more business questions based on an initial business planning model; exposing the one or more business questions in a User Interface (UI) display screen accessible to one or more client computers in communication with a cloud-based business planning software application that embodies the initial business planning model; receiving one or more answers the one or more business questions; employing the one or more answers to automatically generate an updated business planning model; using the updated business planning model to expose one or more new questions in an updated UI display screen, the updated UI display screen generated in accordance with an updated business planning model embodying the updated business planning model; and repeating the above steps each time a new answer is provided to one or more business questions presented in the updated UI display screen.

Another alternative method for using a dynamic business planning model as part of a deployed cloud-based software application includes employing a dynamic business planning model to selectively generate User Interface (UI) rendering instructions for displaying a dynamic list of business questions; receiving one or more answers to one or more questions of the dynamic list of business questions; employing the one or more answers to: generate one or more business model artifacts; associate the one or more business model artifacts with one or more sets of software functionality; incorporate one or more new features into the business planning model based on a mapping between the one or more business model artifacts and the one or more sets of software functionality, resulting in an updated business planning model; and then selectively deploying an update to the cloud-based business software application, resulting in an updated cloud-based business software application in response thereto, the cloud-based business software application based on the updated business planning model.

Figure 8:
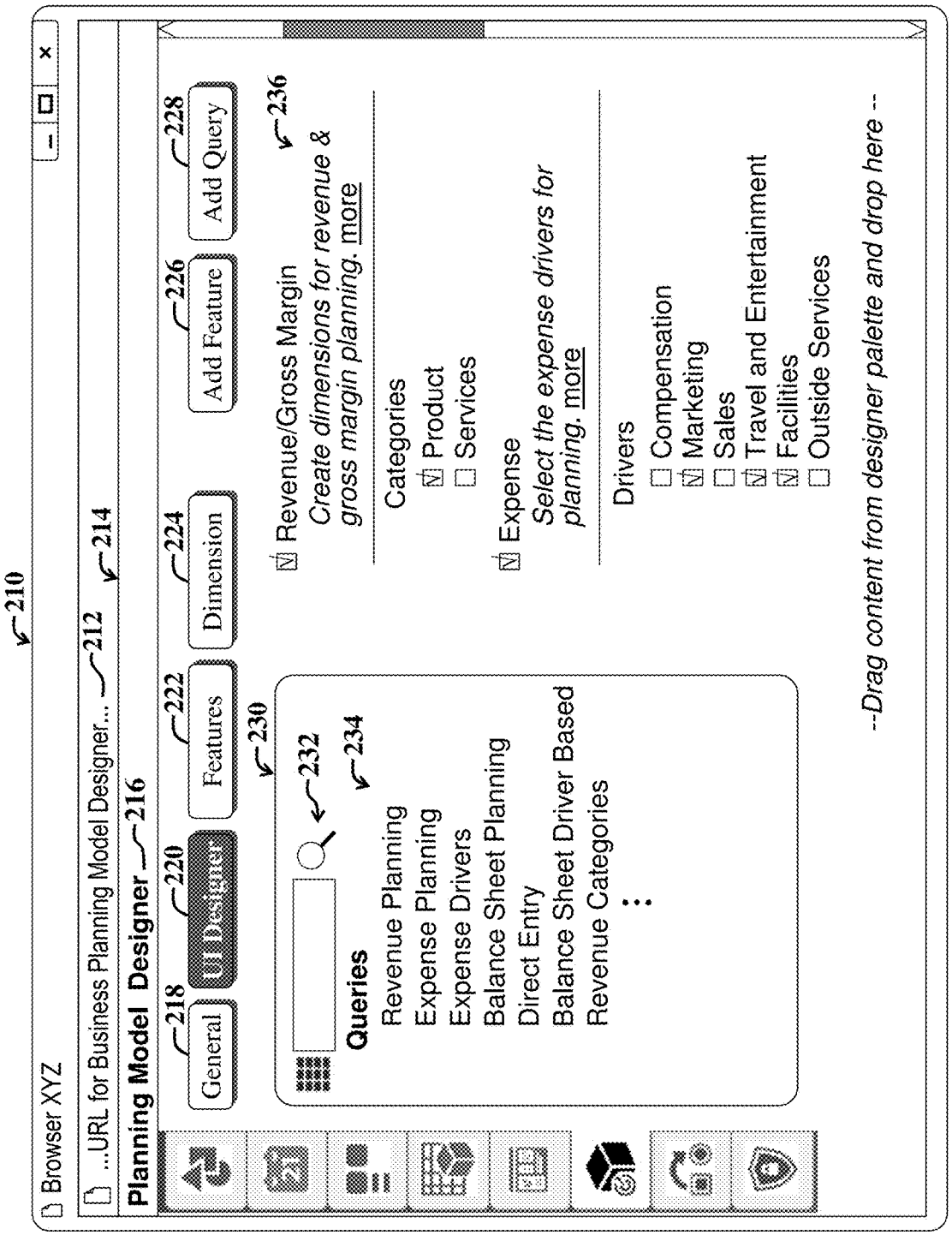
FIG. 8 shows a first example UI display screen that may be accessible via the developer system(s) of FIG. 1 and illustrating developer options for specifying queries (e.g., business questions), which may then be answered by a customer administrator via the customer administrator system(s) of FIG. 1.

FIG. 8 shows a first example UI display screen 210 that may be accessible via the developer system(s) 12 of FIG. 1 and illustrating developer options (corresponding to UI controls 218-236) for specifying queries (e.g., business questions), which may then be answered by a customer administrator via the customer administrator system(s) 22 of FIG. 1 and accompanying UI display screens (an example of which is shown in FIG. 10).

The UI display screen 210 may be presented via a browser, e.g., after a developer or designer has browsed to a URL 212 for a business planning model designer tool (as indicated by a title 216 of a section 214 of the associated development environment). The example UI display screen 210 and accompanying controls 218-236 correspond to the query selection and layout options 28 of FIG. 1.

The example controls 218-236 include various buttons 218-224 for accessing various sub sections of the planning model designer tool. Additional buttons 226, 228 represent options for adding and/or defining features and queries, respectively, which may be used with a designer palette 230.

Currently, a developer has selected a UI designer option 220, thereby triggering display of various UI controls 230-236 for selecting business questions, i.e., queries for display in a customer administrator UI display screen. The UI controls 230-236 include a designer palette 230 that lists various previously defined queries 234, which are searchable via a search field 232.

A developer may drag queries from the list of queries 234 of the designer palette 230 to a query-listing section 236. The query-listing section 236 is partly representative of how the accompanying queries (represented by check boxes in FIG. 8) will appear in a customer administrator UI display screen, but includes additional options for creating dimensions, selecting expense drivers, and so on.

Figure 9:
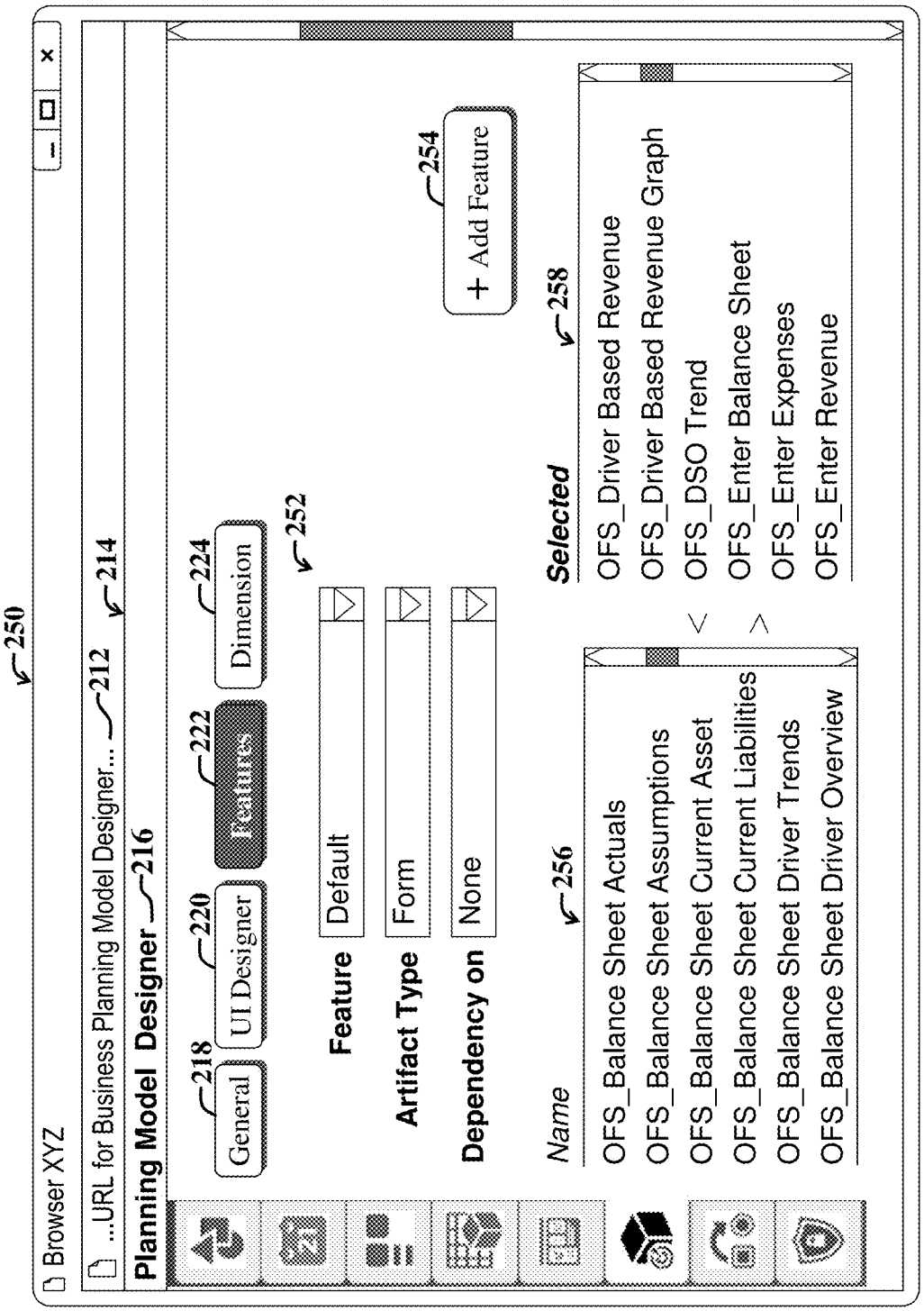
FIG. 9 shows a second example UI display screen that may be accessible via the developer system(s) of FIG. 1 and illustrating developer options for mapping (e.g., associating) UI artifacts to features or functionality.

FIG. 9 shows a second example UI display screen 250 that may be accessible via the developer system(s) 12 of FIG. 1 and illustrating developer options 218-258 for facilitating mapping (e.g., associating) UI artifacts to features or functionality. The various controls 218-258 correspond to the artifact selection and mapping options 32 of FIG. 1.

The UI display screen 250 represents another screen of the model designer 216, which appears after user selection of the features button 222. The UI controls 218-258 include drop-down menus 252 for selecting features, associated artifact types, and dependencies. For each combination of selected feature, artifact type, and dependency, different artifacts (and/or features) may be available for selection in sections 256, 258 appearing below the drop-down menus 252.

Example artifacts available for selection are shown in a name section 256. Artifacts from the name section 256 may be moved to a selected section 258, which lists selected artifacts. The selected artifacts will then be associated with the specified feature, artifact type, and/or dependency, as selected in the drop-down menus 252.

An option 254 to add features is also provided. Selection of the add-feature button 254 may trigger display of another UI display screen with options for selecting and/or otherwise defining or configuring new feature(s). Newly configured features may appear in the feature drop-down menu of the drop-down menus 252.

FIG. 10 shows a third example UI display screen 270 that may be accessible via the customer administrator system(s) 22 of FIG. 1 and illustrating administrator options 278-286 to provide answers to business questions 284, 286, which may then be used to automatically adapt the associated software application in accordance with the provided answers.

The present example UI display screen 70 represents a "configure financial statement" section 274, as indicated via a section title 276. The section 274 may be accessed by a customer administrator who has browsed to and logged into a business planning console.

The customer administrator has selected an enable-features button 280 from among plural options 278-282, which has triggered display of various queries 284, 286, including revenue-related queries 284 and expense-related queries 286. Note that some of the listed queries (shown as check boxes) 284, 286 may be implemented as flex dimensions, i.e., configurable dimensions. Impacts on the underlying business planning model caused by selection of flex dimensions can be captured as a delta in an XML file, the delta of which is then mapped to the associated parent feature (which, for example, may correspond to the revenue/gross margin query, which may include sub-queries that are implementable via flex dimensions).

After a customer administrator has answered the queries 284, e.g., by selecting and/or deselecting check boxes, the underlying software model is automatically revised accordingly, e.g., using mechanisms as discussed in FIGS. 1-5 above.

The UI display screen 70 may be dynamically generated. The listed queries 284, 286 are tied to one or more features, which may be defined in XML. For each feature, the underlying system may automatically determine (e.g., in accordance with previous developer-specified settings) how variable components (for presenting the queries—e.g., components such as check boxes, radio buttons, drop-down menus, etc.) are to be displayed in a UI display screen (e.g., the UI display screen 270).

Figure 11:
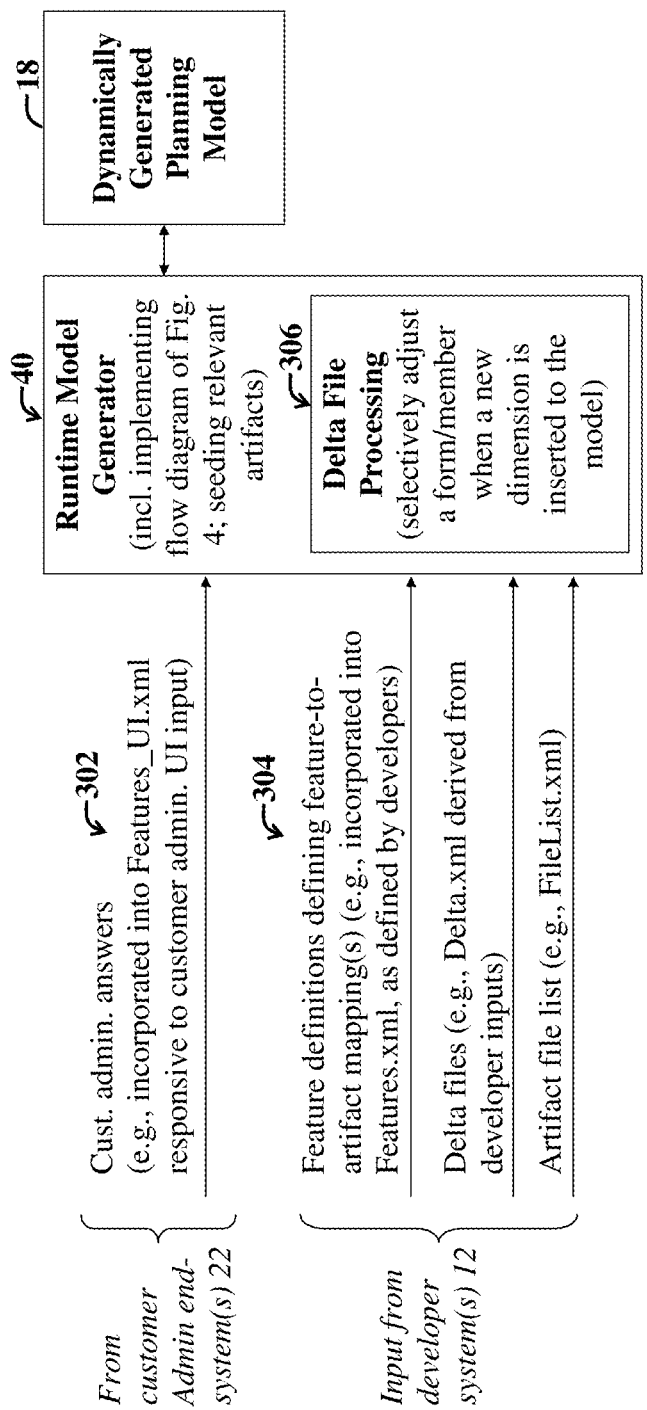
FIG. 11 is a second block diagram illustrating example XML file inputs to an example embodiment of the runtime model generator of the system of FIG. 1.

FIG. 11 is a second block diagram illustrating example XML file inputs 302, 304 to an example embodiment of the runtime model generator 40 of the system 10 of FIG. 1. The inputs 302, 304 are used by the runtime model generator 40 to selectively generate, update, and/or otherwise replace the dynamically generated planning model 18.

The XML inputs 302, 304 include a first XML file (called Features_UI.xml herein) 302 that incorporates one or more answers to business questions provided via the customer administrator system(s) 22 of FIG. 1. The one or more answers may be routed and/or processed via the dynamic integrator 42 and UI generator 44 of FIG. 1. Each business question and associated answer map to one or more model features, as specified via feature definitions (e.g., in a Features.xml file) incorporated among additional XML inputs 304.

In the present example embodiment, the dynamic integrator 42 of FIG. 1 includes code for facilitating integrating input to the runtime model generator 40. The dynamic integrator 42 of FIG. 1 further includes code for orchestrating the enablement of features for a model by handling artifact dependencies, and may further include code for controlling when to push metadata to a multidimensional database management system (e.g., Essbase) and to define the order of loading of artifacts during initialization and deployment of a model as a deployed package. The dynamic integrator 42 of FIG. 1 also includes code for allowing communication across various different models for integration purposes.

The runtime model generator 40 leverages functionality of the dynamic integrator 42 of FIG. 1 to facilitate integrating user input (e.g., customer administrator input via the Features_UI.xml file) to the runtime generator 40. Accordingly, inputs 302, 304 to the runtime generator 40 may be selectively processed by the dynamic integrator 42 of FIG. 1 before being input to the runtime model generator 40.

Customer administrator interaction with a UI display screen that has been rendered using rendering instructions obtained from the UI generator 44 of FIG. 1 enables capturing of the answers and corresponding adjustments to the second XML file (called Features.xml herein) to activate one or more features associated with the one or more answers, and to activate or load the artifact(s) associated with the feature(s), as discussed more fully below. Business question answers map to one or more model features in a second XML file (Features.xml).

In the present example embodiment, features have been pre-associated with artifacts, e.g., as specified via an artifact file list included among additional XML inputs 304 from the developer system 12 of FIG. 1. The additional XML inputs 304 further include the second XML file (Features.xml) and one or more delta files (called Delta.xml herein). Note that the artifact file list may be incorporated into another XML file (e.g., FileList.xml).

In the present example embodiment, the artifact file list (included among the additional inputs 304) includes a list of artifacts that are available in the package associated with the model being updated. An example FileList.xml includes various "filebase" entries that represent artifacts/files in the package. Filenames for each filebase entry are generated based on the artifact type, model prefix, and the file base value. Note that the accretion, release, and version data may be incorporated into the FileList.xml to specify versioning support for the package for use in meeting upgrade requirements. The FileList.xml may be automatically generated using preexisting cloud services application Life Cycle Management (LCM) export functionality.

The following list names various example artifact types that may be used as name attributes in an example FileList.xml file:

a. Smartlist—Contains list of all smartlists/enumerations used in the model.
b. Dimension—Contains list of all dimensions used in the model.
c. substitutionVariable—Contains list of all substitution/essbase variables used in the model.
d. form—Contains list of all forms including dashboards & composite forms used in the model.
e. menu—List of all menus used in the model.
f. userVariable—List of all variables used in the model.
g. calcmgrrule—Rule file (contains all calculation manager artifacts in a single file format).
h. validcombo—Valid intersections.
i. mapReporting—Data maps.
j. dlf—Artifact string file for various locales.

In the present example embodiment, the second XML file (Features.xml) included among the additional inputs 304 includes a listener section. In cases where one feature depends upon another feature that may be included in or used by different models, the listener provides an interface that is defined in the second XML file (Features.xml).

Any time a model (and accompanying features for the model) is being initialized and enabled, the listeners in the Features xml for all models that have already been initialized will be listened on. When the initialization of a model is complete, the runtime model generator 40 and/or accompanying runtime system 20 of FIG. 1 dispatch an event that is captured and processed by the listeners. This allows for flexibility and independence as to what features and accompanying artifacts for different models must be loaded and when.

Note that the runtime model generator 40 implements a version of the process flow 110 of FIG. 4, e.g., wherein a delta is applied (e.g., in accordance with one or more Delta.xml file(s)) when a new dimension artifact is added to a form artifact. Accordingly, the additional inputs 304 include delta files and/or delta file entries as needed for all the features that add new dimension.

In the present example embodiment, a delta file (Delta.xml) is generated based on the input from a model developer using the developer system 12 of FIG. 1. This delta file contains information specifying what changes should be applied to an artifact (e.g., form and/or form member) when a new artifact (e.g., dimension) is inserted to the model. Accordingly, the delta file enables the runtime model generator 40 to perform delta file processing 306, which includes selectively adjusting a form/member when a new dimension is inserted into the model.

In summary, once the Features_UI.xml 302 is generated, a page is rendered (e.g., via the customer administrator system 22 of FIG. 1, as shown in FIG. 8), enabling a customer administrator to specify an answer to a business question. Then, based on the answer(s), one or more corresponding features will be loaded. The runtime model generator 40 maps the selected features to the artifacts (using the inputs 304) that are to be loaded, and then loads the artifacts into the model and associated application, i.e., deployed package.

Note that the runtime model generator 40 addresses a long-felt unsolved need in the art. Previously, without the runtime model generator 40 pre-shipped models often had to undergo many changes, i.e., customizations, based on particular business requirements, before end user customers could use the software packages implementing the pre-shipped models. Sometimes, customizing the model would take more time than rebuilding the entire model, thereby making use of the pre-shipped static model virtually useless in those cases.

In certain embodiments of the dynamic model generator 40, the number of models that can be generated may be a permutation combination of the features that customer administrators are allowed to pick and choose from (e.g., by providing answers to business questions). In one embodiment, which has been implemented, over 10,000 different models can be dynamically generated based on different features that are available in various different business processes. Use of conventional systems to meet requirements for building and maintaining such models could be prohibitive without use of the runtime model generator 40 and accompanying system 10 of FIG. 1.

For example, conventionally, to merely change a label displayed in a form could mean having to manually change all of the models that use the associated form artifact. Use of the dynamic runtime model generator 40 and associated system 10 of FIG. 1 may enable efficient adjustment of hundreds of things (e.g., artifacts, features, etc.) post development of the initial model, and at runtime.

Note that the package 54 of FIG. 1 is readily deployable via use of the runtime model generator 40 and accompanying functionality and modules shown in FIGS. 1 and 11. In one embodiment, a cloud services platform used to consume the package 54 of FIG. 1 provides a registry to register the package 54 that is deployed using the cloud services platform.

Modules of a deployed package can be registered in various ways, including but not limited to:
1. Modules can try to register by themselves when a server becomes available, by implementing a listener that monitors the cloud services platform.
2. The cloud services platform can scan for specific file format indicative of a file that has necessary details of models to be loaded; and can then load the associated models.
3. At the time of deployment, a developer may write to a specific file about each model and when it is to deployed; then such file can be read by the cloud services platform.

Once the cloud services platform recognizes a model, it can then invokes the UI Generator 44 of FIG. 1 to render the UI(s) for a selected model; and then invoke the runtime model generator 40 to generate the actual model based on end user (e.g., customer administrator) input. Various artifacts usable by a particular model may be bundled into a <<ModelName>>.jar file, which can be then deployed to a planning enterprise application, as the deployed package 54 of FIG. 1.

Hence, with reference to FIG. 1, a model developer using the developer system 12 is provided with a developer tool (e.g., as may be implemented via the planning model generation framework 14 of FIG. 1) for defining queries (business questions) suitable for a given planning model, and for designing dynamic end UI display screens listing the queries (where the response to these queries will ultimately be used to generate the planning model).

The input from model developer is captured in a deployable format; and then used at runtime to generate/render the UI display screen(s) that allows end users (e.g., customer administrators) to provide answers for the queries. In the present example embodiment, the model developer inputs are captured in XML file format to facilitate reading, parsing, and generating the UI display screens. Use of the XML format can also facilitate defining dependencies between various UI components.

Figure 12:
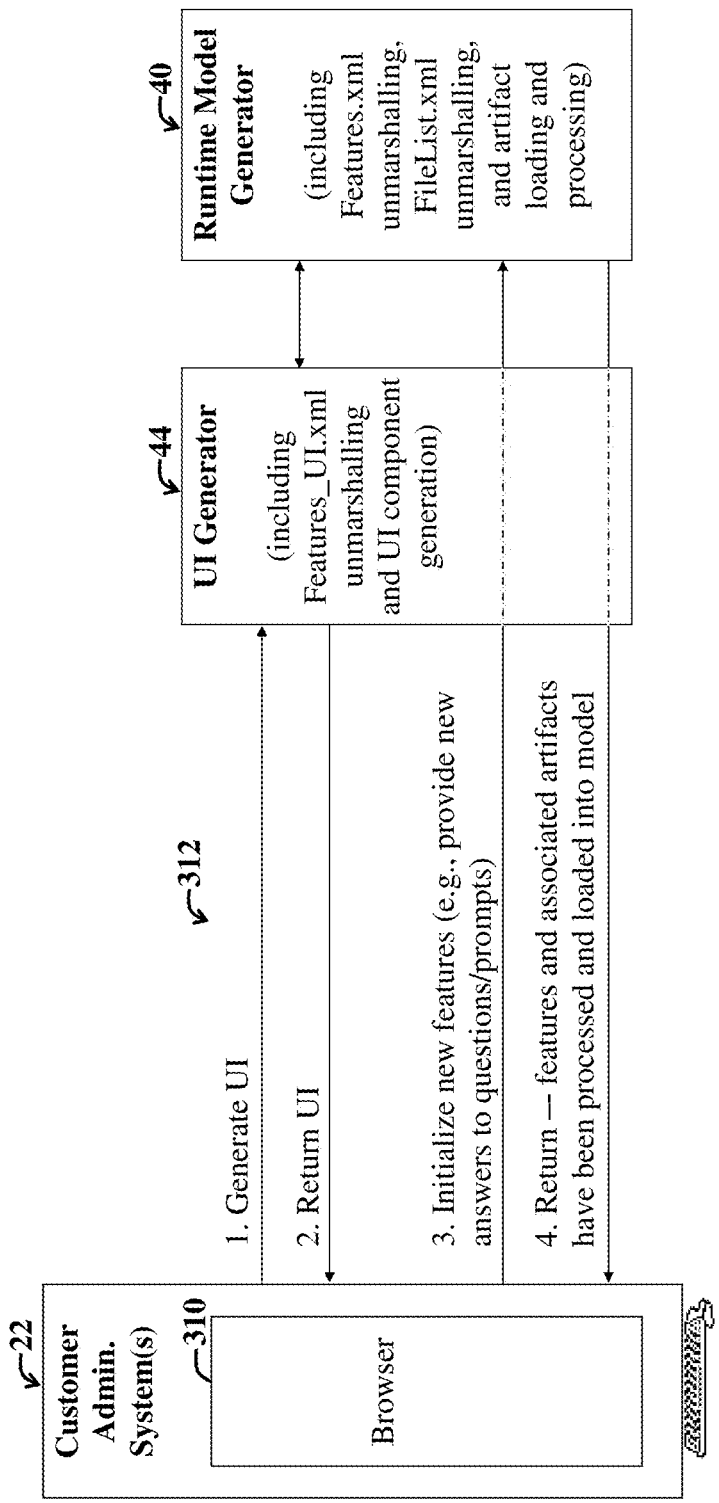
FIG. 12 is a third block diagram illustrating an example messaging sequence between the customer administrator system, UI generator, and runtime model generator of the system of FIG. 1 for a particular example use case.

FIG. 12 is a third block diagram illustrating an example messaging sequence 312 between the customer administrator system 22, UI generator 44, and runtime model generator 40 of the system 10 of FIG. 1 for a particular example use case.

The customer administrator system 22 is shown including a browser 310, which initiates one or more messages (1.) to the UI generator 44 in response to user input provided to display a particular UI display screen. The one or more messages may comprise network messages associated with a customer administrator browsing to a URL associated with a deployed package; logging in; and navigating to a page (e.g., as shown in FIG. 8). The page includes one or more options to provide one or more answers to one or more business questions. The page content (2.) is returned to the customer administrator system 22 and is viewable via the accompanying browser 310.

Next, in the present example scenario, the customer administrator provides answers to one or more business questions via the browser 310. The answers correspond to one or more model features that are to be added to the model (characterizing the deployed package, e.g., the package 54 of FIG. 1) and initialized. One or more messages that indicate the one or more answers are then provided to the runtime model generator 40, e.g., via an updated Features_UI.xml file.

The runtime model generator 40 then uses information from the Features.xml file and artifact file list (FileList.xml) to determine which artifacts to load for each feature (that is to be loaded) based on the one or more answers provided by a customer administrator using the customer administrator system 22 and accompanying browser 310. After the feature(s) and associated artifact(s) are processed and loaded into the model, an indication of such (4.) may be delivered back to the browser 310 of the customer administrator system 22.

Figure 13:
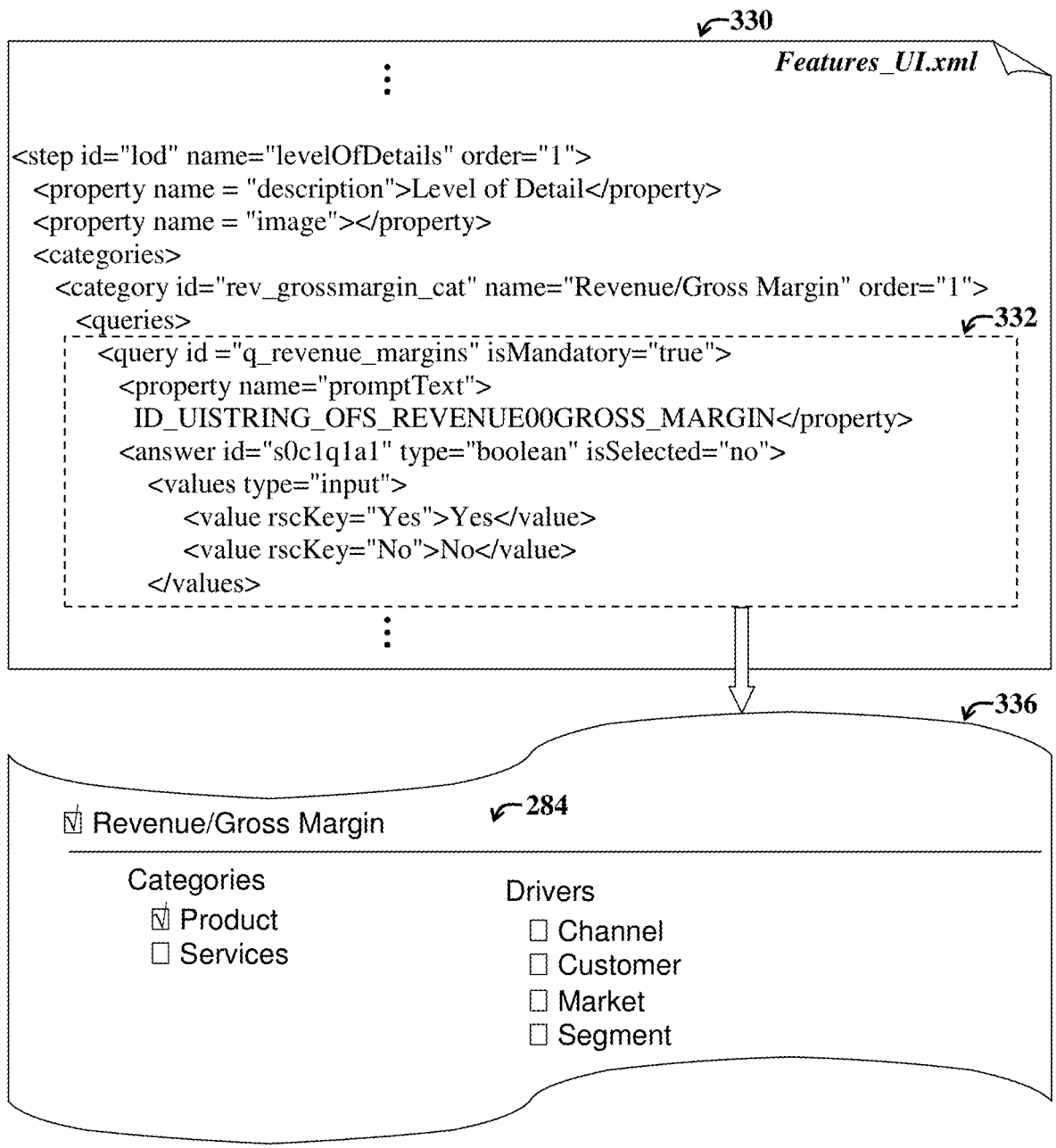
FIG. 13 illustrates a portion of an example XML file (called Features_UI.xml herein) defining a UI display screen accessible via the customer administrator system of FIGS. 1 and 12, which provides one or more user options for specifying answer(s) to one or more business questions, the answer(s) of which may be input to the runtime model generator as shown in FIG. 11 via an updated XML file that incorporates the answer(s).
Figures 1, 14:
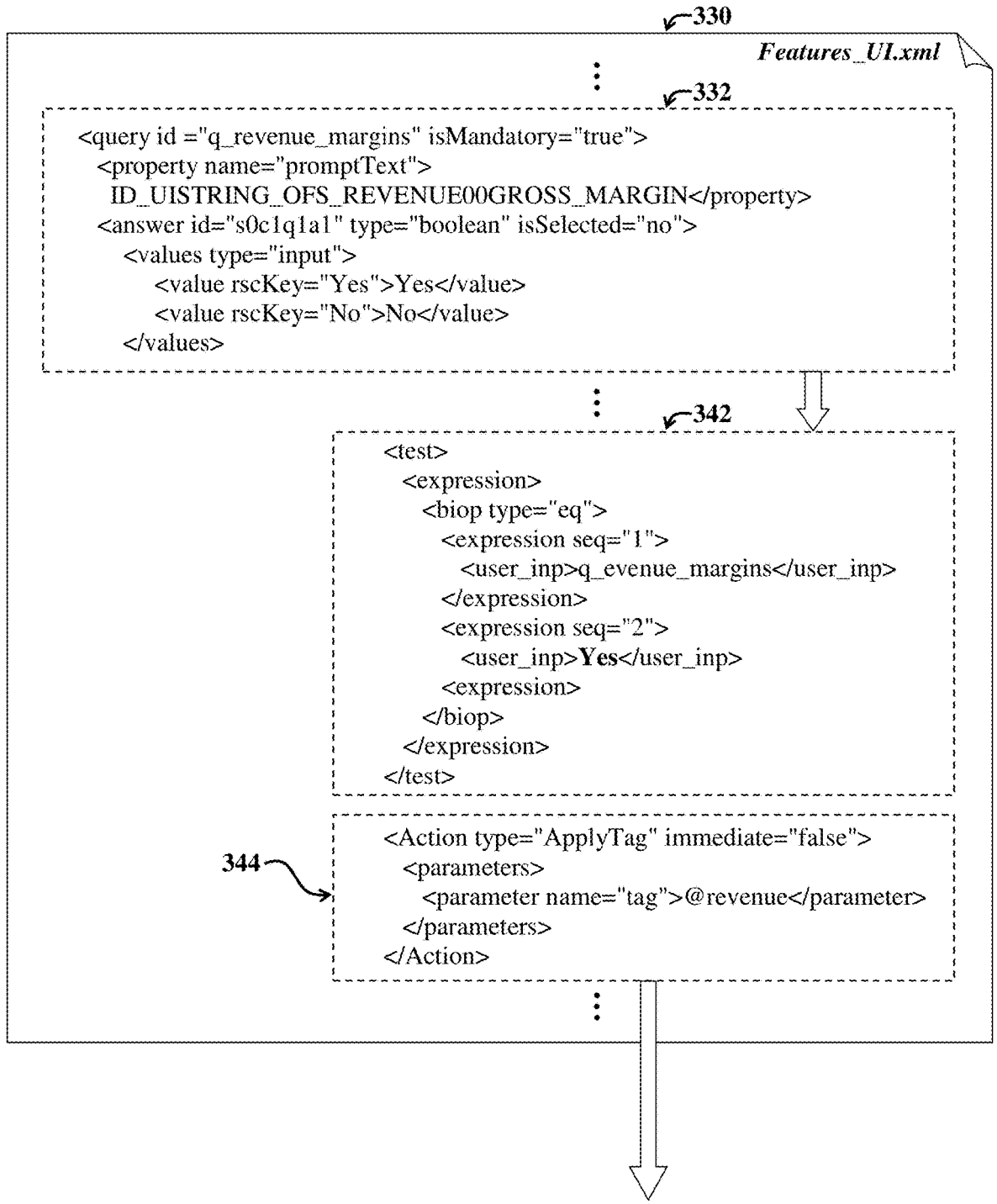
Figures 2, 14:
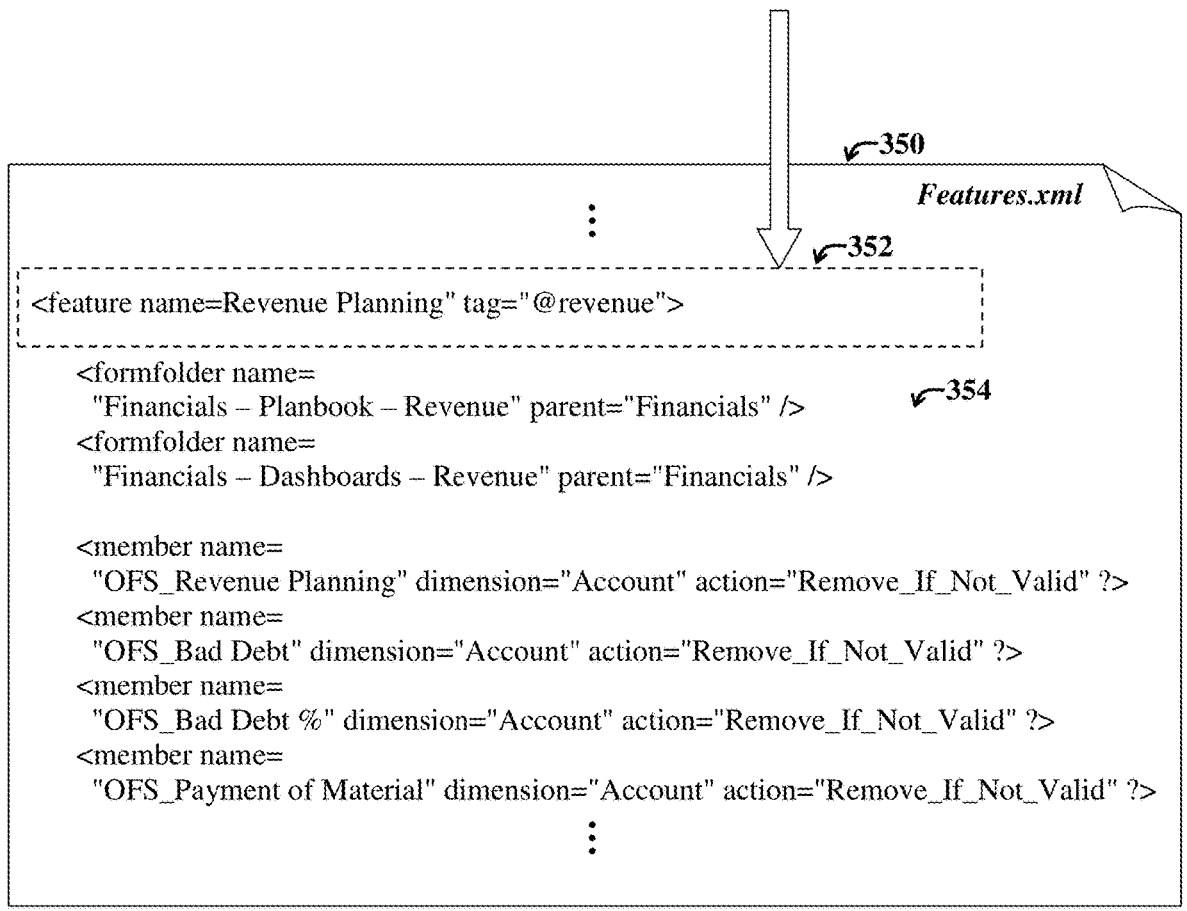
Figures 1, 15:
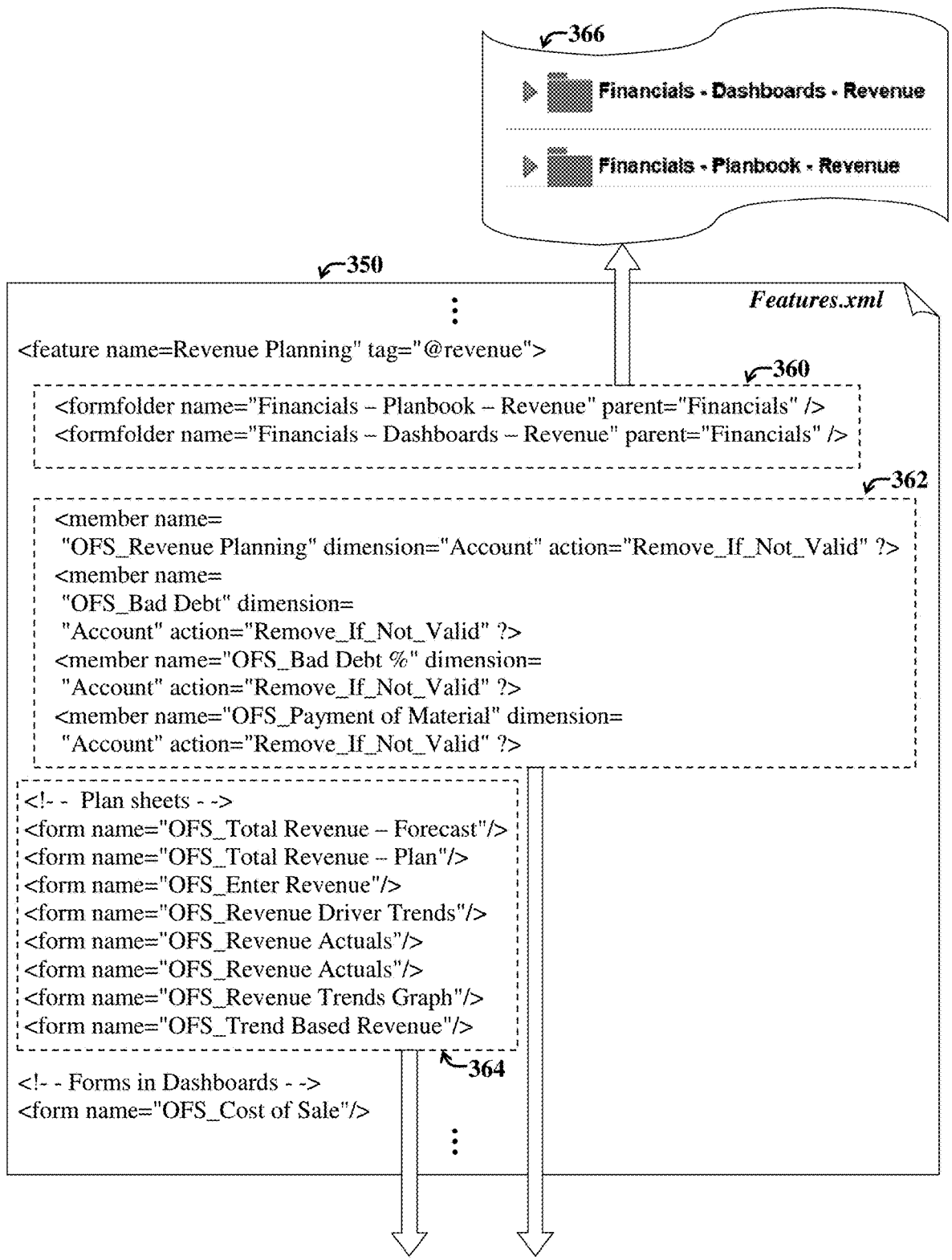
Figures 2, 15:
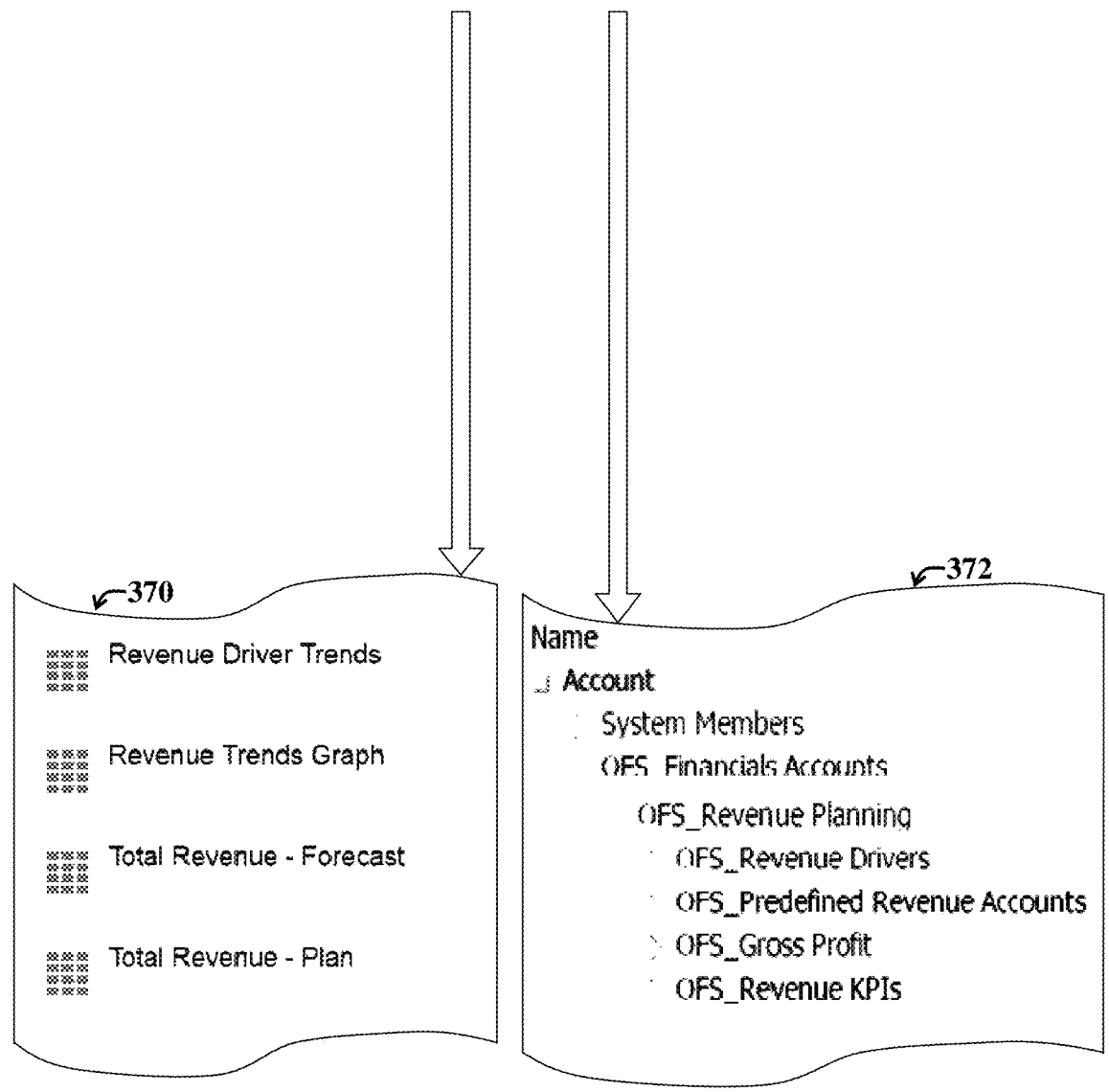

The following discussion with reference to FIGS. 13-15 discusses an example use case involving a customer administrator deciding to incorporate a revenue planning feature into a deployed package by providing a corresponding answer in a customer administrator UI, e.g., the UI of FIG. 8.

FIG. 13 illustrates a portion of an example XML file (called Features_UI.xml herein) defining a UI display screen accessible via the customer administrator system 22 of FIGS. 1 and 12. The UI display screen (e.g., as shown in FIG. 8, and a portion 336 of which is shown in FIG. 13) provides one or more user options 284 for specifying answer(s) to one or more business questions, e.g., by checking one or more boxes. The answer(s) may be input to the runtime model generator 40 as shown in FIGS. 11 and 12 via an updated Features_UI.xml file that incorporates the answer(s).

In FIG. 13, an example portion 332 of a Features_UI.xml file 330 corresponds to or otherwise defines a corresponding portion 336 of a UI display screen accessible via the customer administrator system 22 of FIGS. 11 and 12. When a customer administrator specifies an answer, e.g., by checking a "Revenue/Gross Margin" check box from among the options 284, the Features_UI.xml automatically updates accordingly, as discussed more fully below.

FIG. 14-1 illustrates additional portions of the Features_UI.xml file 330 of FIG. 13 after a customer administrator has specified "Revenue/Gross Margin" as an answer to a query (implemented via a check box in FIG. 13), resulting in updating of the Features_UI.xml file, as shown in additional sections 342, 344.

The additional sections 342, 344, include a first section 342, which indicates "Yes" for the answer corresponding to whether or not to enable the "Revenue/Gross Margin" feature. A revenue tag is then applied in a second section 344 to indicate that the "Revenue/Gross Margin" feature represents a revenue feature in Features.xml, as discussed more fully below with reference to FIG. 14-2.

FIG. 14-2 is a continuation of FIG. 14-1 and illustrates example portions of a second XML file (called Features.xml herein) 350 that is automatically updated responsive to the answer(s) to business question(s) specified in the updated Features_UI.xml file 330 of FIG. 14-1. The Features_UI.xml file 330 of FIG. 14-1 has been updated in accordance with the answer(s) specified via a customer administrator using the UI display screen portion 336 of FIG. 13.

The resulting Features.xml file 350 is updated (as indicated in a feature name section 352) to enable the "Revenue Planning" feature associated with the "Revenue/Gross Margin" selection, i.e., answer of "Yes." Various artifacts 354 associated with the feature are also identified.

FIG. 15-1 illustrates additional example portions of the second XML file (Features.xml) 350 of FIG. 14-2, and shows how the different example portions 360-364 define different deployed application UI display screen portions (366 of FIGS. 15-1 and 370, 372 of FIG. 15-2) and associated functionality represented by artifacts and the associated selected feature(s). The selected feature(s) correspond to one or more answers provided via the UI display screen section 336 of FIG. 13.

For example, a first XML section 360 is usable to render a first UI display screen section 336 of a deployed package representative of the updated model, which has been updated to reflect an answer provided by the customer administrator via a selection made in the UI display screen portion 336 of FIG. 13. The first UI display screen section 366 illustrates form folders for financial dashboards and a financials plan book, as specified via the first XML section 360.

FIG. 15-2 is a continuation of FIG. 15-2 and illustrates additional example UI display screen portions 370, 372 of a deployed application based on an updated model. The UI display screen sections 370, 372 of are defined via the second XML file, i.e., the Features.xml file 350 of FIG. 15-1.

With reference to FIGS. 15-1 and FIG. 15-2, a second XML section 362 specifies artifacts used to render various form folder members shown in a second UI display screen portion 372 of FIG. 15-2. Similarly, a third XML section 364 of FIG. 15-1 artifacts used to render various forms (and/or links thereto) shown in a third UI display screen section 370.

Figure 16:
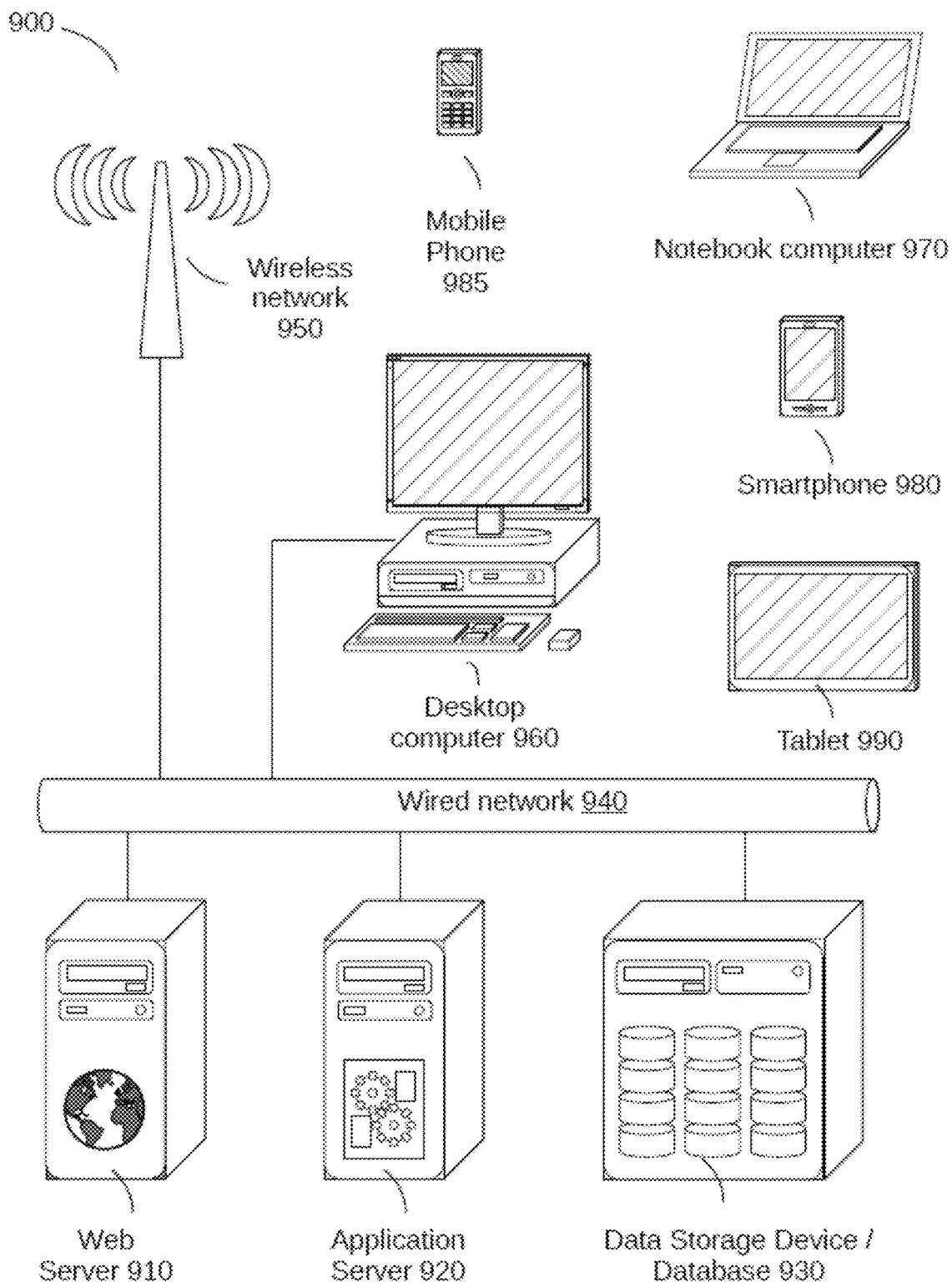
FIG. 16 is a general block diagram of a system and accompanying computing environment usable to implement the embodiments of FIGS. 1-7.

FIG. 16 is a general block diagram of a system 900 and accompanying computing environment usable to implement the embodiments of FIGS. 1-7. The example system 900 is capable of supporting or running various hardware and/or software modules and associated methods discussed with reference to FIGS. 1-10. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java®, C, C++, C#, or any scripting language, such as JavaScript® or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans®, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript® application on the user computer may be used to retrieve or analyze data and display portions of the applications.

With reference to FIGS. 1 and 16, the developer system(s) 12, customer administrator system(s) 22, and customer end-user system(s) 24 of FIG. 1 may be implemented in whole or in part via one or more of the desktop computer 960, notebook computer 970, smartphone 980, mobile phone 985, tablet 990, of FIG. 16 and/or other computing devices. In a particular example embodiment, the computing devices 960-990 run browsers, e.g., used to display the developer UI(s) 26 and UIs of the customer administrator system(s) 22 and customer end-user system(s) 24 of FIG. 1. Examples of such UIs are shown in FIGS. 8-10.

In a particular example embodiment, browsers of the systems 12, 22, 24 of FIG. 1 connect to the Internet, represented by the wired network 940 and/or wireless network 950 as shown in FIG. 16, to access one or more network-coupled servers, databases, and/or associated cloud-based functionality, as represented by the modules 14-20 of FIG. 1. Note that one or more of the web server 910, application server 920, and data storage device or database 930 shown in FIG. 16 may be used to host software corresponding to the modules 14-20 of FIG. 1, as detailed more fully below.

In the particular example embodiment, the model artifact constructor 16, planning model generation framework 14 (including the accompanying flex dimension framework 36, feature-artifact mapping module 38, runtime model generator 40, dynamic integrator 42, UI generator 44), dynamic business planning module 18 and accompanying model adaptation module 46 (including model specifications 48, question generator 50, and answer incorporator 52), and the packaging, delivery, deployment, and runtime system 20 (and accompanying cloud-deployed package 54) of FIG. 1 run in a cloud computing environment that includes a collection of plural web servers 910, application servers 920, and data storage devices 930 shown in FIG. 16.

For example, in the particular example embodiment, the planning model generation framework 14 and model artifact constructor 16 of FIG. 1 run on a process cloud that communicates with a document cloud via an integration mechanism, e.g., middleware, APIs, web services, etc. The document cloud maintains data storage devices 930 of FIG. 16 to maintain data that is generated by customers, e.g., via the customer end-user systems 24 of FIG. 1 through use of the cloud-deployed package 54. The process cloud in combination with the document cloud act as an overall cloud that supports development, deployment, dynamic adaptation, and use of dynamic software applications and accompanying models (e.g., the dynamic business planning model 18 of FIG. 1) shown in FIG. 1.

In general, software developers e.g., users of the developer systems 12 of FIG. 1, may subscribe to certain cloud services to facilitate development of software applications and storage of associated files. A cloud service that is configured for software application or process flow development is called a Process Cloud Service (PCS) herein.

A process cloud service may employ a networked database, e.g., the data storage device 930 of FIG. 16, to store files and other objects used by a given software program being developed. Server-side development environments may be accessible to developers via browsers. The development environments may be backed by the PCS, such that developed software application files are stored in the PCS database corresponding to the one or more of the data storage devices 930 of FIG. 16.

A document cloud may include document management functionality in communication with folder structures and documents and may incorporate functionality for adding rich metadata documents and folders. The document management functionality may include MetaData Services (MDS) for characterizing folders and documents and associated structures with various types of metadata. The document management functionality may further include software (which may include a combination of webpage code from a web server 910 of FIG. 16 and supporting application code of an application server 920 of FIG. 16, where the webpage code may call the application code using web services, APIs, etc.) for generating one or more customer UI display screens, e.g., UI display screens presented via browsers of the customer administrator systems 22 and customer end-user systems 24 of FIG. 1.

In the particular example embodiment, the UI display screens (examples of which are shown in FIGS. 8-10) include accompanying UI controls and associated options. Example options include options to browse, create, delete, define, upload, download, etc., folders, structures, and documents, etc., as maintained via the folder structures and documents.

Note that in the particular example embodiment, browsers used by the developer system 12, customer administrator system 22, and customer end-user system 24 of FIG. 1, interface with web servers 910 shown in FIG. 16 to access websites and accompanying webpage code, which is backed by applications used to implement the modules 16-20 of FIG. 1. The webpage code of the web servers 910 of FIG. 16 use web services, APIs, and/or other interfacing mechanisms to communicate with application software hosted on application servers 920 of FIG. 16 of the cloud, which includes a collection of web servers 910, application servers 920, and data storage devices 930 of FIG. 16.

Note that various embodiments discussed herein may provide substantial benefits in terms of providing efficiencies in systems and methods that achieve a new and useful end as it pertains to new software adaptability. In particular, certain embodiments discussed herein uniquely leverage input from customers, the input of which may change over time as user needs change, to enable substantial hereto-for-not possible or practical dynamic software model reconfiguration and/or reconstruction.

Certain embodiments may provide virtually automatic incorporation of such inputs into a seamlessly adaptable software package that is responsive to the changing user needs and automatically seamlessly handles software integrations. Such was heretofore not possible in the manner discussed herein, as efficient non-cost-prohibitive methods for rapidly adapting such software and accompanying modules was lacking in the art.

Accordingly, various embodiments provide new capabilities for efficient software adaptation, in part by uniquely leveraging associations between user-provided answers to questions, sets of software model artifacts; sets of software functionality, and one or more mappings or relationships selectively established therebetween.

Figure 17:
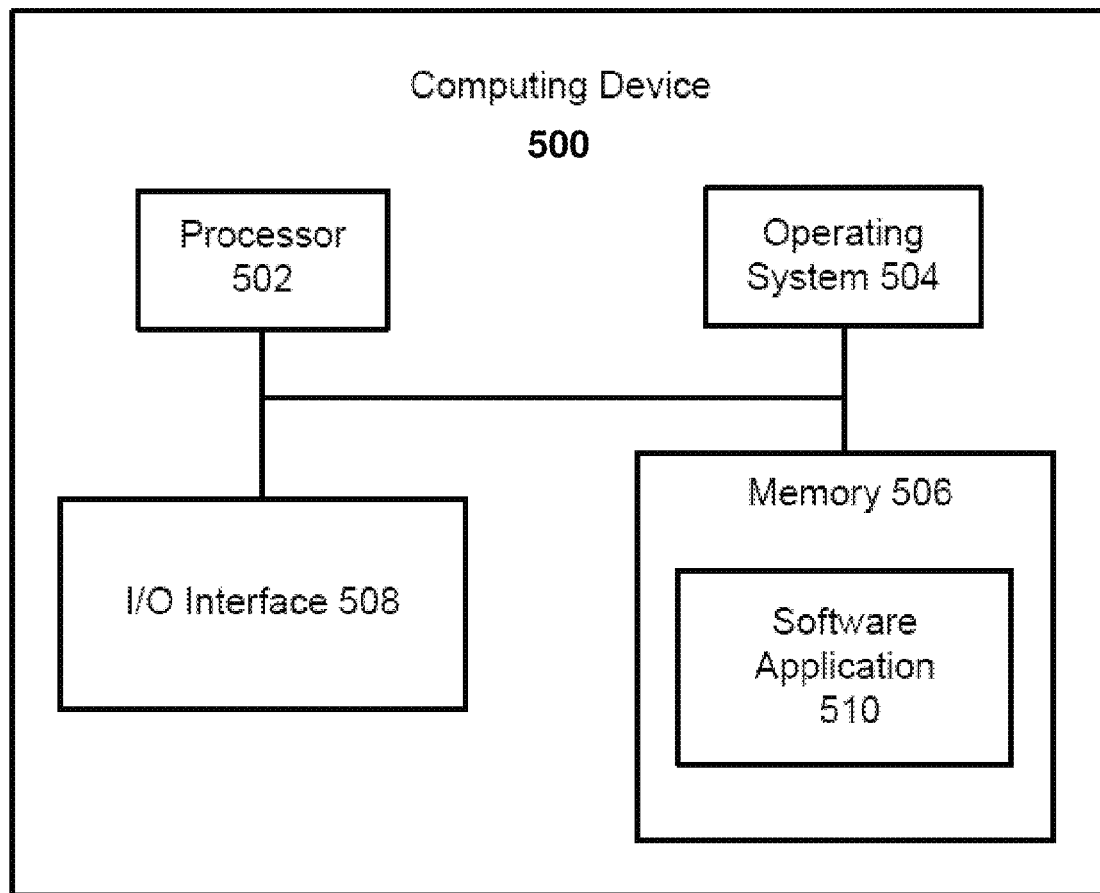
FIG. 17 is a general block diagram of a computing device usable to implement the embodiments of FIGS. 1-8.

FIG. 17 is a general block diagram of a computing device 500 usable to implement the embodiments described herein. While the computing device 500 of FIG. 17 may be described as performing one or more of the steps in the embodiments herein, in other embodiments any suitable component or combination of components of the computing device 500 or any suitable processor or processors associated with system 500 may facilitate performing the steps.

FIG. 17 illustrates a block diagram of an example computing system 500, which may be used for implementations described herein. For example, computing system 500 may be used to implement server devices 910, 920 of FIG. 16 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 17 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address development, deployment, and use of dynamic business planning models used to implement cloud-based enterprise software applications and associated services, embodiments are not limited thereto.

For example, various embodiments need not be deployed via an Internet cloud, but instead may be hosted on an internal enterprise server on a local network. Furthermore various embodiments may be implemented as desktop software, such that the incremental updating happens on the end-user computer on which the software leveraging the dynamic planning model runs. In addition, embodiments are not limited to use in conventional business applications and computing environments, and may be used, for example, by governments, universities, and other organizations to facilitate various types of planning activities. In addition, embodiments need not be limited to planning software, but may be used to dynamically update different types of software that may benefit by the ability to dynamically adapt to specific needs and/or changing needs of an organization and/or associated computing environment.

Any suitable programming language can be used to implement the routines of particular embodiments including C, C++, Java®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating business planning operations, the method comprising:
   receiving a business planning model configured with information to generate at least a first business planning module with features and artifacts, wherein the features and artifacts include a first set of features and artifacts represented as a first set of User Interface (UI) elements of a display;
   receiving one or more answers to one or more business questions employed to selectively update the features and artifacts of the business planning model with a second set of features and artifacts to be represented as a second set of UI elements of the display;

employing a process to update the business planning model, wherein the process in response to the one or more answers to the one or more business questions is configured to update the business planning model to avoid conflicts associated with and between the first set of features and artifacts and the second set of features and artifacts;

in response to the one or more answers, updating the business planning model by incorporating the second set of features and artifacts into the business planning model; and in response to a request to initialize the first business planning module, employing a listener section of the business planning model to generate an event signal in response to incorporating the second set of features and artifacts into the business planning model.

2. The method of claim 1, wherein at least some of the features and artifacts represent UI controls configured to enable configuration of mappings associated with business model artifacts, wherein the mappings refer to associations between the business model artifacts and features.

3. The method of claim 1, wherein at least some of the features and artifacts are represented by UI controls configured to facilitate construction, selection, and configuration of business model artifacts.

4. The method of claim 1, further comprising mapping at least some of the one or more answers to the second set of features and artifacts.

5. The method of claim 4, wherein mapping further comprises implementing feature-artifact mappings in accordance with groupings of the one or more business questions and the one or more answers to the one or more business questions.

6. The method of claim 1, wherein the one or more answers and the one or more business questions are dynamically generated and are configured to modify and adapt the business planning model into an arbitrarily complex business model in response to a user defined purpose.

7. The method of claim 1, wherein the process further comprises determining whether functionality associated with at least some of the features and options conflicts with other features and options associated with at least one other business planning module.

8. The method of claim 1, wherein the process comprises delta encoding configured to generate a file describing updates to apply to the business planning model.

9. The method of claim 1, wherein the listener section provides an interface configured to interface a first feature in the first business planning module with a second feature of a second business planning module.

10. The method of claim 9, wherein the first business planning module and the second business planning module are connected by a network.

11. A non-transitory computer-readable storage medium device including instructions executable by one or more processors, the instructions comprising:

receiving a business planning model configured with information to generate at least a first business planning module with features and artifacts, wherein the features and artifacts include a first set of features and artifacts represented as a first set of User Interface (UI) elements of a display;

receiving one or more answers to one or more business questions employed to selectively update the features and artifacts of the business planning model with a second set of features and artifacts to be represented as a second set of UI elements of the display;

employing a process to update the business planning model, wherein the process in response to the one or more answers to the one or more business questions is configured to update the business planning model to avoid conflicts associated with and between the first set of features and artifacts and the second set of features and artifacts;

in response to the one or more answers, updating the business planning model by incorporating the second set of features and artifacts into the business planning model; and in response to a request to initialize the first business planning module, employing a listener section of the business planning model to generate an event signal in response to incorporating the second set of features and artifacts into the business planning model.

12. The non-transitory computer-readable storage medium device of claim 11, wherein at least some of the features and artifacts represent UI controls configured to enable configuration of mappings associated with business model artifacts, wherein the mappings refer to associations between the business model artifacts and features.

13. The non-transitory computer-readable storage medium device of claim 11, wherein at least some of the features and artifacts are represented by UI controls configured to facilitate construction, selection, and configuration of business model artifacts.

14. The non-transitory computer-readable storage medium device of claim 11, further comprising mapping at least some of the answers to the second set of features and artifacts.

15. The non-transitory computer-readable storage medium device of claim 14, wherein mapping further comprises implementing feature-artifact mappings in accordance with groupings of the one or more business questions and answers to the one or more business questions.

16. The non-transitory computer-readable storage medium device of claim 11, wherein the one or more answers and the one or more business questions are dynamically generated and are configured to modify and adapt the business planning model into an arbitrarily complex business model in response to a user defined purpose.

17. The non-transitory computer-readable storage medium device of claim 11, wherein the process further comprises determining whether functionality associated with at least some of the features and options conflicts with other features and options associated with at least one other business planning module.

18. The non-transitory computer-readable storage medium device of claim 11, wherein the process comprises delta encoding configured to generate a file describing updates to apply to the business planning model.

19. The non-transitory computer-readable storage medium device of claim 11, wherein the listener section provides an interface configured to interface a first feature in the first business planning module with a second feature of a second business planning module.

20. An apparatus for facilitating construction of a dynamic business planning model, the apparatus comprising:

one or more processors;

a non-transitory computer-readable storage device including instructions comprising:

receiving a business planning model configured with information to generate at least a first business planning module with features and artifacts, wherein the features and artifacts include a first set of features and artifacts represented as a first set of User Interface (UI) elements of a display;

receiving one or more answers to one or more business questions employed to selectively update the features and artifacts of the business planning model with a second set of features and artifacts to be represented as a second set of UI elements of the display;

employing a process to update the business planning model, wherein the process in response to the one or more answers to the one or more business questions is configured to update the business planning model to avoid conflicts associated with and between the first set of features and artifacts and the second set of features and artifacts;

in response to the one or more answers, updating the business planning model by incorporating the second set of features and artifacts into the business planning model; and in response to a request to initialize the first business planning module, employing a listener section of the business planning model to generate an event signal in response to incorporating the second set of features and artifacts into the business planning model.

* * * * *